(12) United States Patent
Suzuki et al.

(10) Patent No.: US 11,247,657 B2
(45) Date of Patent: Feb. 15, 2022

(54) CONTROL SYSTEM FOR HYBRID VEHICLES

(71) Applicant: TOYOTA JIDOSHA KABUSHIKI KAISHA, Toyota (JP)

(72) Inventors: Yosuke Suzuki, Hadano (JP); Hideaki Komada, Gotemba (JP); Hidekazu Nagai, Susono (JP); Takahito Endo, Sunto-gun (JP); Hirotsugu Yoshino, Susono (JP); Hiroki Yasui, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 16/298,568

(22) Filed: Mar. 11, 2019

(65) Prior Publication Data

US 2019/0276000 A1 Sep. 12, 2019

(30) Foreign Application Priority Data

Mar. 12, 2018 (JP) .............................. JP2018-044733

(51) Int. Cl.
| | |
|---|---|
| *B60W 20/20* | (2016.01) |
| *B60W 20/00* | (2016.01) |
| *B60K 6/40* | (2007.10) |
| *B60K 6/26* | (2007.10) |
| *B60K 6/383* | (2007.10) |

(52) U.S. Cl.
CPC ............... *B60W 20/00* (2013.01); *B60K 6/26* (2013.01); *B60K 6/383* (2013.01); *B60K 6/40* (2013.01);
(Continued)

(58) Field of Classification Search
CPC ...... B60W 20/00; B60W 20/20; B60W 20/40; B60W 2510/246; B60W 2510/1045; B60W 2510/244; B60W 2710/083; B60W 2540/10; B60W 10/06; B60W 10/08; B60W 10/10; B60W 30/19; B60K 6/40; B60K 6/26; B60K 6/383; B60K 2006/268;
(Continued)

(56) References Cited

U.S. PATENT DOCUMENTS

| | | | | |
|---|---|---|---|---|
| 6,083,138 A | * | 7/2000 | Aoyama ................ | B60K 6/543 477/5 |
| 7,865,287 B2 | * | 1/2011 | Huseman ............... | B60K 6/445 701/53 |

(Continued)

FOREIGN PATENT DOCUMENTS

| | | |
|---|---|---|
| CN | 1877168 A | 12/2006 |
| CN | 104276031 A | 1/2015 |

(Continued)

*Primary Examiner* — Donald J Wallace
*Assistant Examiner* — Daniel M. Robert
(74) *Attorney, Agent, or Firm* — Sughrue Mion, PLLC

(57) ABSTRACT

A control system for a hybrid vehicle that shift an operating mode to an appropriate mode from a low mode or high mode. The hybrid vehicle comprises a power split mechanism connected to an engine and a first motor. When a required brake torque of a prime mover cannot be achieved during propulsion in an operating mode established by engaging one of clutches while stopping the engine, the control system excites a motoring of the engine by the first motor while maintaining engagement of the clutch engaged to establish the current operating mode.

11 Claims, 17 Drawing Sheets

(52) U.S. Cl.
CPC ............ *B60K 2006/268* (2013.01); *B60W 2510/1045* (2013.01); *B60W 2510/244* (2013.01); *B60W 2510/246* (2013.01); *B60Y 2200/92* (2013.01); *B60Y 2300/18125* (2013.01); *B60Y 2400/427* (2013.01)

(58) Field of Classification Search
CPC .. B60K 2006/381; B60K 6/365; B60K 6/387; B60K 6/445; B60Y 2200/92; B60Y 2300/18125; B60Y 2400/427; Y02T 10/72; Y02T 10/62
See application file for complete search history.

(56) References Cited

U.S. PATENT DOCUMENTS

| | | | | |
|---|---|---|---|---|
| 8,905,892 | B1 * | 12/2014 | Lee | B60K 6/42 475/317 |
| 9,067,587 | B1 * | 6/2015 | Johri | B60W 10/06 |
| 10,990,098 | B2 * | 4/2021 | Kishi | B60W 10/11 |
| 2006/0276289 | A1 * | 12/2006 | Hirata | B60W 20/15 475/5 |
| 2015/0210266 | A1 * | 7/2015 | Yang | B60K 6/52 701/22 |
| 2016/0031438 | A1 * | 2/2016 | Matsui | B60K 6/442 701/22 |
| 2016/0368361 | A1 | 12/2016 | Endo et al. | |
| 2017/0158188 | A1 * | 6/2017 | Hokoi | B60L 50/61 |
| 2018/0244263 | A1 * | 8/2018 | Bower | B60W 10/02 |

FOREIGN PATENT DOCUMENTS

| | | | |
|---|---|---|---|
| CN | 105102285 A | | 11/2015 |
| CN | 106256583 A | | 12/2016 |
| CN | 106965799 A | | 7/2017 |
| JP | 2006027491 A | * | 2/2006 |
| JP | 2007-161209 A | | 6/2007 |
| JP | 2017-007437 A | | 1/2017 |
| JP | 2017-105231 A | | 6/2017 |

* cited by examiner

Fig. 3

| Operating Mode | | CL1 | CL2 | B1 | MG1 | MG2 | ENG |
|---|---|---|---|---|---|---|---|
| HV Mode | HV-Lo Mode | ● | – | – | G | M | ON |
| | HV-Hi Mode | – | ● | – | G | M | ON |
| | Fixed Mode | ● | ● | – | | | ON |
| EV Mode | Dual-Motor Mode EV-Lo Mode | ● | – | ● | M | M | OFF |
| | Dual-Motor Mode EV-Hi Mode | – | ● | ● | M | M | OFF |
| | Single-Motor Mode | – | – | – | | M | OFF |

CONTROL SYSTEM FOR HYBRID VEHICLES

CROSS-REFERENCE TO RELATED APPLICATIONS

The present disclosure claims the benefit of Japanese Patent Application No. 2018-044733 filed on Mar. 12, 2018 with the Japanese Patent Office, the disclosures of which are incorporated herein by reference in its entirety.

BACKGROUND

Field of the Disclosure

Embodiments of the present disclosure relate to the art of a control system for a hybrid vehicle in which an operating mode can be selected from a plurality of modes.

Discussion of the Related Art

JP-A-2017-007437 describes a hybrid vehicle comprising: a complex planetary gear unit having a first rotary element connected to an engine, a second rotary element connected to a first motor, and a third rotary element connected to drive wheels; a first clutch that connects a pair of the rotary elements of the planetary gear unit, a second clutch that connects another pair of the rotary elements of the planetary gear unit; and a brake that connects the first rotary element to a stationary member. According to the teachings of JP-A-2017-007437, the hybrid vehicle is allowed to propel by engaging the brake and the first clutch or the second clutch to deliver torque of the first motor.

In the hybrid vehicle described in JP-A-2017-007437, a low mode in which a speed ratio between the first motor and the drive wheels is large can be established by engaging the brake and the first clutch, and a high mode in which a speed ratio between the first motor and the drive wheels is small can be established by engaging the brake and the second clutch. Those operating modes can be switched between a disconnection mode established by disengaging the brake, and a hybrid mode in which the engine is rotated while disengaging the brake. The disconnecting mode and the hybrid mode have different advantages depending on operating conditions of the engine, the first motor, and the like. Therefore, it is preferable to shift the operating mode properly from the low mode or the high mode depending on the operating condition of the hybrid vehicle.

SUMMARY

Aspects the present disclosure have been conceived noting the foregoing technical problems, and it is therefore an object of the present disclosure to provide a control system for hybrid vehicle configured to shift the operating mode to an appropriate mode from the low mode or the high mode.

The control system according to the exemplary embodiment of the present disclosure is applied to a hybrid vehicle, comprising: a power split mechanism having a plurality of rotary elements including a first rotary element connected to an engine, a second rotary element connected to a first motor, and a third rotary element connected to drive wheels; a second motor that is connected to the drive wheels to deliver a torque to the drive wheels; a first engagement device that selectively connects a predetermined pair of the rotary elements; and a second engagement device that selectively connects another pair of the rotary elements. In the hybrid vehicle, an operating mode may be selected at least from a first operating mode in which the first engagement device is engaged and the second engagement device is disengaged, and a second operating mode in which the first engagement device is disengaged and the second engagement device is engaged. The control system is provided with a controller that controls the operating mode. The controller is configured to: determine a satisfaction of at least any one of predetermined conditions including a facts that a required amount of a total torque of a prime mover including the engine and the second motor applied to the drive wheels is greater than a predetermined torque, that a change in a speed of an output shaft changed by a torque delivered from the drive wheels is greater than a predetermined value, and that a required period of time to complete a shifting operation between the first operating mode and the second operating mode is less than a predetermined period, when propelling the hybrid vehicle in any one of the first operating mode and the second operating mode while stopping the engine; and execute a motoring of the engine by the first motor while maintaining an engagement of the engagement device engaged to establish said one of the operating modes upon satisfaction of the predetermined condition.

In a non-limiting embodiment, the predetermined torque may be set to a maximum total torque possible to be generated in a condition where the hybrid vehicle is propelled in said one of the operating modes while stopping the engine, and an output torque of the second motor is restricted.

In a non-limiting embodiment, the output torque of the second motor may be restricted when the output torque of the second motor reaches an upper limit value set based on a temperature of an electric storage device and a state of charge level of the electric storage device.

In a non-limiting embodiment, the total torque may be a synthesized torque of an engine braking torque established by rotating the engine passively, and at least a regenerative braking torque established by the second motor.

In a non-limiting embodiment, the control system may further comprise a one-way clutch that restricts a rotation of the first rotary element in a predetermined direction, and that allows the first rotary element to rotate in an opposite direction. Said one of the operating modes may include an electric vehicle mode in which the hybrid vehicle is propelled by generating a torque by the first motor in such a manner as to restrict the rotation of the first rotary element by the one-way clutch.

In a non-limiting embodiment, the predetermined value may be set to a value smaller than a maximum allowable torque of the one-way clutch.

In a non-limiting embodiment, the output shaft may be connected to the drive wheels. The controller may be further configured to determine the fact that the change in the speed of the output shaft is greater than the predetermined value when the change in the speed of the output shaft changed by the torque delivered from the drive wheels to the output shaft due to a road condition is greater than the predetermined value.

In a non-limiting embodiment, the controller may be further configured to determine the fact that the required period of time is less than the predetermined period when a required driving force is greater than a predetermined force, and a change amount or change rate of the required driving force is greater than a predetermined value.

In a non-limiting embodiment, the controller may be further configured to: determine a demand to shift the operating mode from a hybrid mode in which the engine is started by the first motor to a fixed mode to be established by engaging both of the first engagement device and the second engagement device while maintaining said one of the operating modes; and shift the operating mode to the fixed mode by engaging the engagement device disengaged in the current operating mode when it is required to shift the operating mode to the fixed mode.

In a non-limiting embodiment, the controller may be further configured to determine a demand to shift the operating mode from said one of the operating modes to the fixed mode, if a rotational speed of at least any one of the engine, the rotary elements, and the first motor is higher than an allowable speed when rotating the first rotary element by delivering a torque from the first motor to the first rotary element while maintaining said one of the operating modes.

In a non-limiting embodiment, the controller may be further configured to determine a demand to shift the operating mode from said one of the operating modes to the fixed mode, if the total torque is smaller than a required torque to be applied to the drive wheels during propulsion while maintaining said one of the operating modes.

In a non-limiting embodiment, the controller may be further configured to: determine a demand to shift the operating mode from the fixed mode to the other operating mode; and establish the other operating mode by maintaining engagement of one of the engagement devices engaged to establish the other operating mode while disengaging the other engagement device, when it is required to shift the operating mode to the other operating mode.

According to the exemplary embodiment of the present disclosure, when the predetermined condition is satisfied during propulsion in one of the operating modes while stopping the engine, the control system executes a motoring of the engine by the first motor while maintaining an engagement of the engagement device engaged to establish one of the operating modes. According to the exemplary embodiment of the present disclosure, therefore, the operating mode can be shifted while achieving a required torque even if a large torque is required. In addition, when an excessive torque is inputted inversely from the drive wheels due to irregularity of a road surface or the like, the rotary elements can be prevented from being subjected to such excessive torque or the operating mode can be shifted to the other mode by rotating the engine. That is, during propulsion in the first operating mode or the second operating mode, the operating mode can be shifted promptly to an appropriate mode.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 3 is a table showing engagement states of engagement devices and operating conditions of the prime movers in each operating mode;

DETAILED DESCRIPTION OF THE PREFERRED EMBODIMENT(S)

Figure 1:
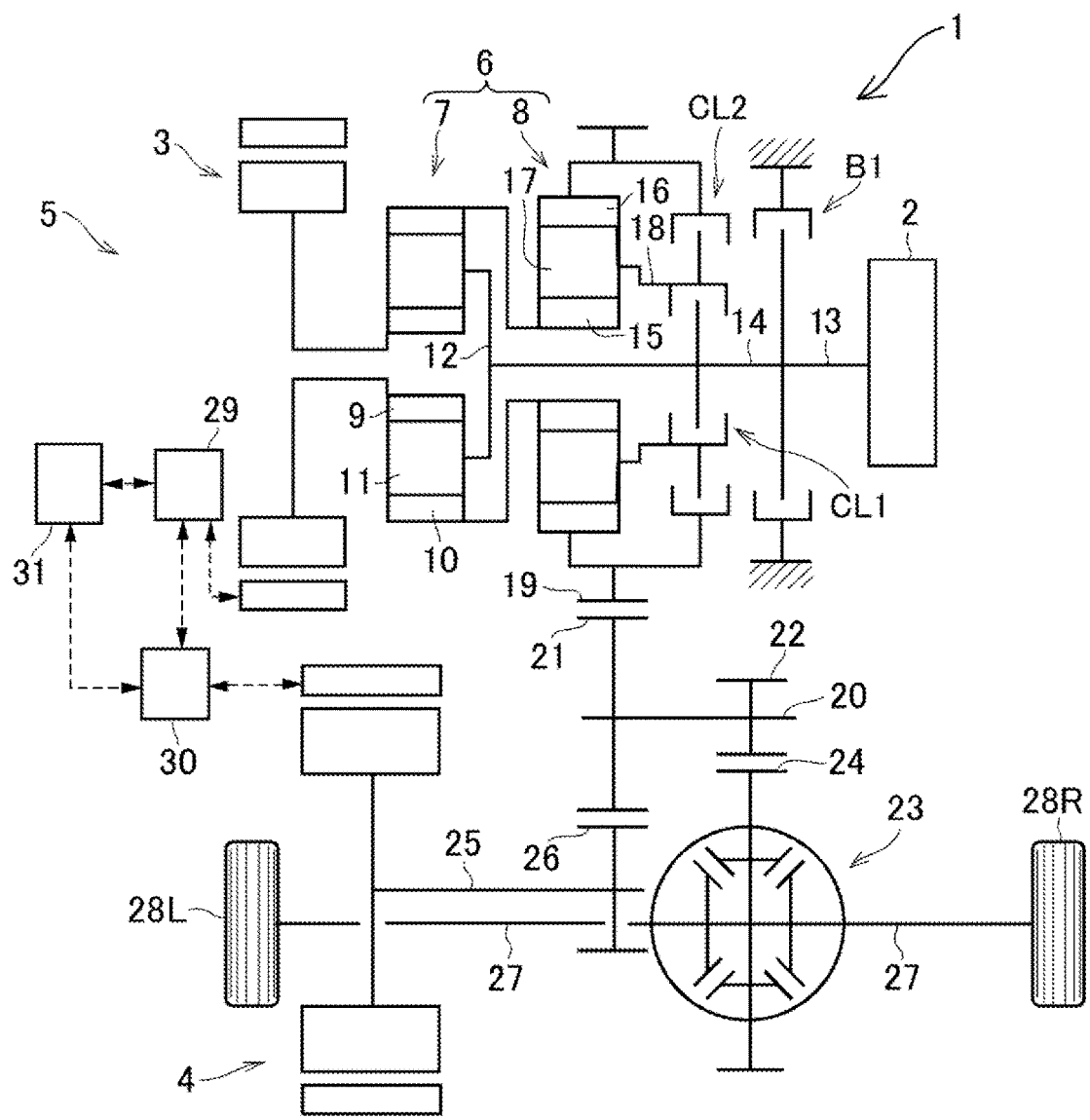
FIG. 1 is a skeleton diagram schematically showing a structure of the hybrid vehicle according to the embodiment of the present disclosure.

Preferred embodiments of the present application will now be explained with reference to the accompanying drawings. Referring now to FIG. 1 there is shown one example of a structure of a hybrid vehicle to which a control system according to the embodiment of the present disclosure is applied. The hybrid vehicle 1 comprises a drive unit 5 including an engine 2, a first motor 3 and a second motor 4. Specifically, the first motor 3 is a motor-generator having a generating function (referred to as "MG1" in the drawings). In the hybrid vehicle 1, a speed of the engine 2 is controlled by the first motor 3, and the second motor 4 is driven by electricity generated by the first motor 3 to generate a drive torque for propelling the vehicle. Likewise, the second motor 4 (referred to as "MG2" in the drawings) is also a motor-generator having a generating function.

A power split mechanism 6 is connected to the engine 2. The power split mechanism 6 includes a power split section 7 that distributes an engine torque to the first motor 3 side and to an output side, and a transmission section 8 that alters a torque split ratio.

For example, a single-pinion planetary gear unit adapted to perform differential action among three rotary elements may be used as the power split section 7. Specifically, the power split section 7 comprises: a sun gear 9; a ring gear 10 as an internal gear arranged concentrically with the sun gear 9; pinion gears 11 interposed between the sun gear 9 and the ring gear 10 while being meshed with both gears 9 and 10; and a carrier 12 supporting the pinion gears 11 in a rotatable manner. In the power split section 7, accordingly, the carrier 12 as a first rotary element serves mainly as an input element, the sun gear 9 as a second rotary element serves mainly as a reaction element.

An output shaft 13 of the engine 2 is connected to an input shaft 14 of the power split mechanism 6 connected to the carrier 12 so that an output power of the engine 2 is applied to the carrier 12. Optionally, an additional gear unit may be interposed between the input shaft 14 and the carrier 12, and a damper device and a torque converter may be interposed between the output shaft 13 and the input shaft 14.

The sun gear 9 is connected to the first motor 3. In the embodiment shown in FIG. 1, the power split section 7 and the first motor 3 are arranged coaxially around a rotational center axis of the engine 2, and the first motor 3 is situated on an opposite side to the engine 2 across the power split section 7. The transmission section 8 is interposed coaxially between the power split section 7 and the engine 2.

Specifically, the transmission section 8 is a single-pinion planetary gear unit comprising: a sun gear 15; a ring gear 16 as an internal gear arranged concentrically with the sun gear 15; pinion gears 17 interposed between the sun gear 15 and the ring gear 16 while being meshed with both gears 15 and 16; and a carrier 18 supporting the pinion gears 17 in a rotatable manner. Thus, the transmission section 8 is also adapted to perform a differential action among the sun gear 15, the ring gear 16, and the carrier 18. In the transmission section 8, the sun gear 15 is connected to the ring gear 10 of the power split section 7, and the ring gear 16 is connected to an output gear 19. Accordingly, the ring gear 16 serves as a third rotary element, and each of the rotary elements 9, 10, 12, 15, 16, 18 of the power split section 7 and the transmission section 8 corresponds to a plurality of rotary elements of the embodiment.

In order to use the power split section 7 and the transmission section 8 as a complex planetary gear unit, a first clutch CL1 is arranged to selectively connect a predetermined pair of rotary elements of the power split mechanism 6. In the drive unit 5 shown in FIG. 1, the first clutch CL1 is adapted to selectively connect the carrier 18 of the transmission section 8 to the carrier 12 of the power split section 7. To this end, for example, a wet-type multiple plate clutch or a dog clutch may be used as the first clutch CL1. Thus, in the drive unit shown in FIG. 1, the power split section 7 is connected to the transmission section 8 to serve as a complex planetary gear unit by bringing the first clutch CL1 into engagement. In the complex planetary gear unit thus formed, the carrier 12 of the power split section 7 is connected to the carrier 18 of the transmission section 8 to serve as an input element, the sun gear 9 of the power split section 7 serves as a reaction element, and the ring gear 16 of the transmission section 8 serves as an output element.

A second clutch CL2 is disposed to rotate the rotary elements of the transmission section 8 integrally. The second clutch CL2 is adapted e.g., to selectively connect the carrier 18 to the ring gear 16 or the sun gear 15, or to connect the sun gear 15 to the ring gear 16. That is, the second clutch CL2 selectively connects another pair of the rotary elements of the power split mechanism 6. In the drive unit 5 shown in FIG. 1, specifically, the second clutch CL2 is adapted to connect the carrier 18 to the ring gear 16. For example, a friction clutch and a dog clutch may also be used as the second clutch CL2.

The first clutch CL1 and the second clutch CL2 are arranged coaxially with the engine 2, the power split section 7, and the transmission section 8 on the opposite side of the power split section 7 across the transmission section 8. The first clutch CL1 and the second clutch CL2 may be arranged not only in parallel to each other in a radial direction but also in tandem in an axial direction. In the embodiment shown in FIG. 1, the first clutch CL1 and the second clutch CL2 are arranged radially parallel to each other and hence an axial length of the drive unit can be shortened. In addition, since a width of the drive unit will not be widened by the clutches CL1 and CL2, the number of friction plates of the frictional clutch can be reduced.

A counter shaft 20 extends parallel to a common rotational axis of the engine 2, the power split section 7, and the transmission section 8. A driven gear 21 is fitted onto one end of the counter shaft 20 to be meshed with the output gear 19, and a drive gear 22 is fitted onto the other end of the counter shaft 20 to be meshed with a ring gear 24 of a differential gear unit 23 as a final reduction. The driven gear 21 is also meshed with a drive gear 26 fitted onto a rotor shaft 25 of the second motor 4 so that power or torque of the second motor 4 is synthesized with power or torque of the output gear 19 at the driven gear 21 to be distributed from the differential gear unit 23 to front wheels 28R and 28L via each drive shaft 27.

In order to selectively stop a rotation of the output shaft 13 or the input shaft 14 for the purpose of delivering the drive torque generated by the first motor 3 to the front wheels 28R and 28L, a brake B1 is arranged in the drive unit 5. For example, a frictional engagement device or a dog brake may be used as the brake B1. Specifically, the carrier 12 of the power split section 7 and the carrier 18 of the transmission section 8 are allowed to serve as reaction elements, and the sun gear 9 of the power split section 7 is allowed to serve as an input element by applying the brake B1 to halt the output shaft 13 or the input shaft 14. To this end, the brake B1 may be adapted to stop the rotation of the output shaft 13 or the input shaft 14 not only completely but also incompletely to apply a reaction torque to those shafts. Alternatively, a one-way clutch may be used instead of the brake B1 to restrict a reverse rotation of the output shaft 13 or the input shaft 14.

As shown in FIG. 1, a first power control system 29 is connected to the first motor 3, a second power control system 30 is connected to the second motor 4. Each of the first power control system 29 and the second power control system 30 individually includes an inverter and a converter. The first power control system 29 and the second power control system 30 are connected to each other, and also connected individually to a battery 31 including a lithium ion battery and a capacitor. For example, when the first motor 3 is operated as a generator while establishing a reaction torque, an electric power generated by the first motor 3 may be supplied directly to the second motor 4 without passing through the battery 31.

Figure 2:
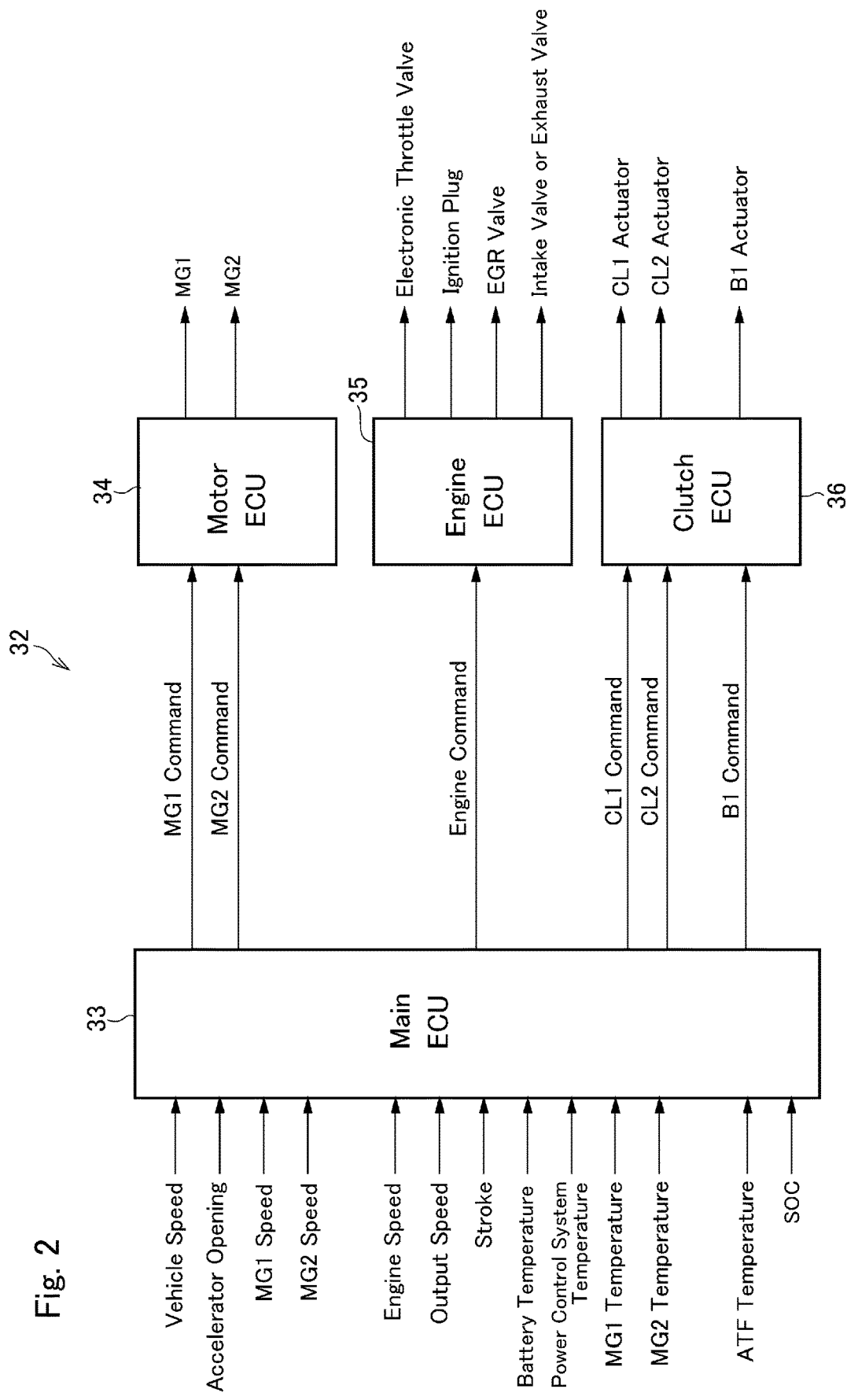
FIG. 2 is a block diagram showing a structure of an electronic control unit.

In order to control the first power control system 29, the second power control system 30, the engine 2, the clutches CL1, CL2, and the brake B1, the hybrid vehicle 1 is provided with an electronic control unit (to be abbreviated as the "ECU" hereinafter) 32 as a controller. The ECU 32 is configured having a microcomputer as its main constituent, and as shown in FIG. 2, the ECU 32 comprises a main ECU 33, a motor ECU 34 (abbreviated as "MG-ECU" in the drawings), an engine ECU 35 and a clutch ECU 36.

The main ECU 33 is configured to execute a calculation based on incident data from sensors as well as maps and formulas installed in advance, and transmits a calculation result to the motor ECU 34, the engine ECU 35, and the clutch ECU 36 in the form of command signal. For example, the main ECU 33 receives data about; a vehicle speed; an accelerator position; a speed of the first motor 3; a speed of the second motor 4; a speed of the output shaft 13 of the engine 2 (i.e., an engine speed); an output speed such as a speed of the ring gear 16 of the transmission section 8 or the counter shaft 20; strokes of pistons of the clutches CL1, CL2, and the brakes B1; a temperature of the battery 31; temperatures of the power control systems 29, 30; a temperature of the first motor 3; a temperature of the second motor 4; a temperature of oil (i.e., ATF) lubricating the power split section 7 and the transmission section 8; and a state of charge (to be abbreviated as the "SOC" hereinafter) level of the battery 31.

Specifically, command signals of output torques and speeds of the first motor 3 and the second motor 4 are transmitted from the main ECU 33 to the motor ECU 34. Likewise, command signals of an output torque and a speed of the engine 2 are transmitted from the main ECU 33 to the engine ECU 35. Further, command signals of torque transmitting capacities (including "0") of the clutches CL1, CL2 and the brake B1 are transmitted from the main ECU 33 to the clutch ECU 36.

The motor ECU 34 calculates current values applied to the first motor 3 and the second motor 4 based on the data transmitted from the main ECU 33, and transmits calculation results to the motors 3, 4 in the form of command signals. In the hybrid vehicle 1 according to the embodiment, an AC motor is used individually as the first motor 3 and the second motor 4. In order to control the AC motors, the command signal transmitted from the motor ECU 34 includes command signals for controlling a frequency of a current generated by the inverter and a voltage value boosted by the converter.

The engine ECU 35 calculates current values to control opening degrees of an electronic throttle valve, an EGR (Exhaust Gas Restriction) valve, an intake valve, and an exhaust valve, and to activate an ignition plug, based on the data transmitted from the main ECU 33, and transmits calculation results to the valves and the plug in the form of command signals. Thus, the engine ECU 35 transmits command signals for controlling a power, an output torque and a speed of the engine 2.

The clutch ECU 36 calculates current values supplied to actuators controlling engagement pressures of the clutches CL1, CL2 and the brake B1 based on the data transmitted from the main ECU 33, and transmits calculation results to the actuators in the form of command signals.

In the drive unit 5 according to the embodiment, an operating mode may be selected from a hybrid mode (to be abbreviated as the "HV mode" hereinafter) in which the hybrid vehicle 1 is propelled by a drive torque generated by the engine 2, and an electric vehicle mode (to be abbreviated as the "EV mode" hereinafter) in which the hybrid vehicle 1 is propelled by drive torques generated by the first motor 3 and the second motor 4 without using the engine 2. The HV mode may be selected from a hybrid-low mode (to be abbreviated as the "HV-Lo mode" hereinafter), a hybrid-high mode (to be abbreviated as the "HV-Hi mode" hereinafter), and a fixed mode. Specifically, in the HV-Lo mode, a rotational speed of the engine 2 (i.e., a rotational speed of the input shaft 14) is increased higher than a rotational speed of the ring gear 16 of the transmission section 8 when a rotational speed of the first motor 3 is reduced substantially to zero. In turn, in the HV-Hi mode, a rotational speed of the engine 2 is reduced lower than a rotational speed of the ring gear 16 of the transmission section 8 when a rotational speed of the first motor 3 is reduced substantially to zero. Further, in the fixed mode, the engine 2 and the ring gear 16 of the transmission section 8 are always rotated at substantially same speeds.

The EV mode may be selected from a dual-motor mode in which both of the first motor 3 and the second motor 4 generate drive torques to propel the hybrid vehicle 1, and a single-motor mode in which only the second motor 4 generates a drive torque to propel the hybrid vehicle 1. The dual-motor mode may be further selected from an electric vehicle-low mode (to be abbreviated as the "EV-Lo mode" hereinafter) in which a torque of the first motor 3 is multiplied by a relatively larger factor, and an electric vehicle-high mode (to be abbreviated as the "EV-Hi mode" hereinafter) in which a torque of the first motor 3 is multiplied by a relatively smaller factor. Thus, the second clutch CL2 for establishing the EV-Hi mode and the first clutch CL1 for establishing the EV-Lo mode are arranged in the differential mechanism (i.e., the transmission section 8) connected to the output gear 19.

In the single-motor mode, the hybrid vehicle 1 is powered only by the second motor 4, while engaging the first clutch CL1, while engaging the second clutch CL2, or while disengaging both of the first clutch CL1 and the second clutch CL2.

FIG. 3 shows engagement states of the first clutch CL1, the second clutch CL2, and the brake B1, and operating conditions of the first motor 3, the second motor 4, and the engine 2 in each operating mode. In FIG. 3, "●" represents that the engagement device is in engagement, "-" represents the engagement device is in disengagement, "G" represents that the motor serves mainly as a generator, "M" represents that the motor serves mainly as a motor, blank represents that the motor serves as neither a motor nor a generator or that the motor is not involved in propulsion of the hybrid vehicle 1, "ON" represents that the engine 2 generates a drive torque, and "OFF" represents that the engine 2 does not generate a drive torque.

Rotational speeds of the rotary elements of the power split mechanism 6, and directions of torques of the engine 2, the first motor 3, and the second motor 4 in each operating mode are indicated in FIGS. 4 to 9. In the nomographic diagrams shown in FIGS. 4 to 9, distances among the vertical lines represents a gear ratio of the power split mechanism 6, a vertical distance on the vertical line from the horizontal base line represents a rotational speed of the rotary member, an orientation of the arrow represents a direction of the torque, and a length of the arrow represents a magnitude of the torque.

Figure 4:
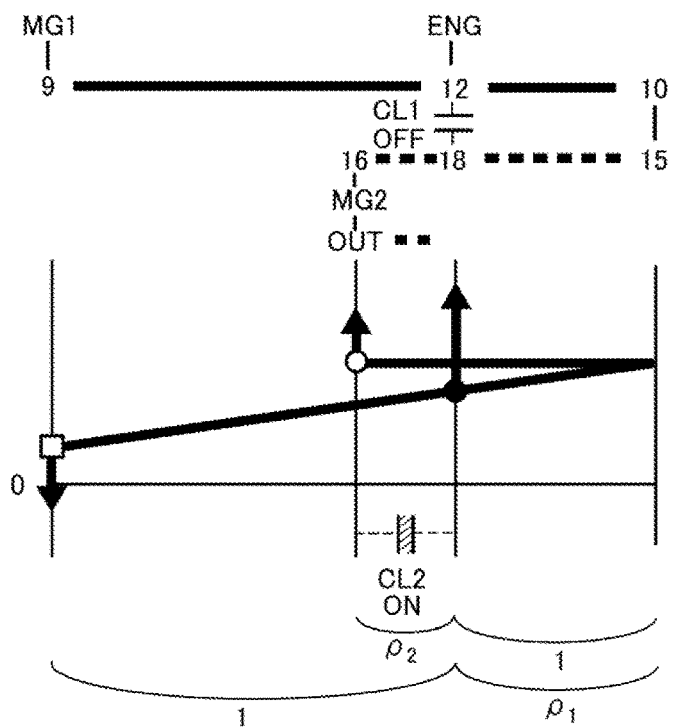
FIG. 4 is a nomographic diagram showing a situation in a HV-Hi mode.
Figure 5:
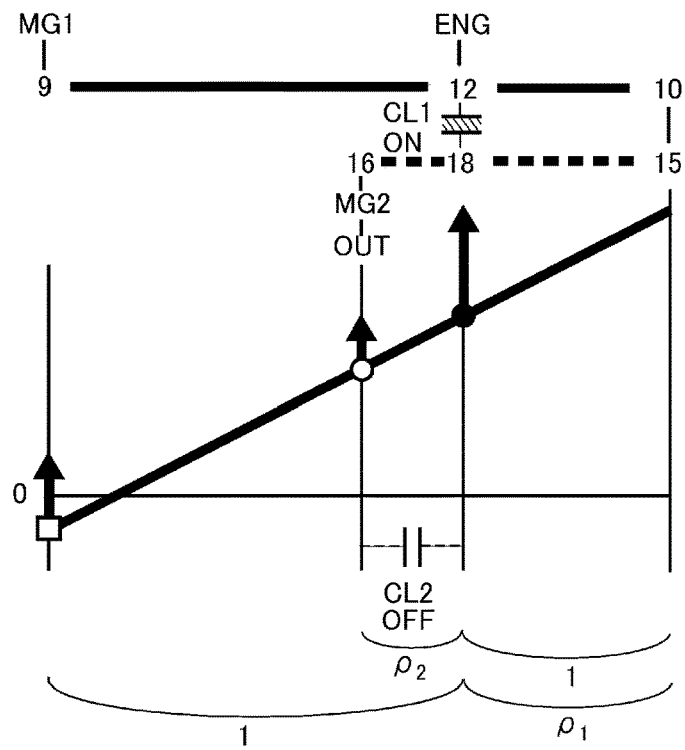
FIG. 5 is a nomographic diagram showing a situation in a HV-Lo mode.

As indicated in FIGS. 4 and 5, in the HV-Hi mode and the HV-Lo mode, any one of the first clutch CL1 and the second clutch CL2 is engaged, and the engine 2 generates a drive torque while establishing a reaction torque by the first motor 3. In this situation, a rotational speed of the first motor 3 is controlled in such a manner as to optimize a total energy efficiency in the drive unit 5 including a fuel efficiency of the engine 2 and a driving efficiency of the first motor 3. Specifically, the total energy efficiency in the drive unit 5 may be calculated by dividing a total energy consumption by an energy to rotate the front wheels 28R and 28L. A rotational speed of the first motor 3 may be varied continuously, and the rotational speed of the engine 2 is governed by the rotational speed of the first motor 3 and a vehicle speed. That is, the power split mechanism 6 may serve as a continuously variable transmission.

As a result of establishing a reaction torque by the first motor 3, the first motor 3 may serve as a generator. In this situation, therefore, a power of the engine 2 is partially translated into an electric energy, and the remaining power of the engine 2 is delivered to the ring gear 16 of the transmission section 8. Specifically, the reaction torque established by the first motor 3 is governed by a split ratio of the torque delivered from the engine 2 to the first motor 3 side through the power split mechanism 6. Such split ratio between the torque delivered from the engine 2 to the first motor 3 side through the power split mechanism 6 and the torque delivered from the engine 2 to the ring gear 16 differs between the HV-Lo mode and the HV-Hi mode.

Given that the torque delivered to the first motor 3 side is "1", a ratio of the torque applied to the ring gear 16 in the HV-Lo mode may be expressed as "$1/(\rho 1 \cdot \rho 2)$", and a ratio of the torque applied to the ring gear 16 in the HV-Hi mode may be expressed as "$1/(\rho 1)$". In the above-expressed expressions, "$\rho 1$" is a gear ratio of the power split section 7 (i.e., a ratio between teeth number of the ring gear 10 and teeth number of the sun gear 9), and "$\rho 2$" is a gear ratio of the transmission section 8 (i.e., a ratio between teeth number of the ring gear 16 and teeth number of the sun gear 15). Specifically, "$\rho 1$" and "$\rho 2$" are individually smaller than "1". That is, in the HV-Lo mode, a ratio of the torque delivered to the ring gear 16 is increased in comparison with that in the HV-Hi mode.

In the HV mode, the electric power generated by the first motor 3 is supplied to the second motor 4, and in addition, the electric power accumulated in the battery 31 is also supplied to the second motor 4 as necessary.

Figure 6:
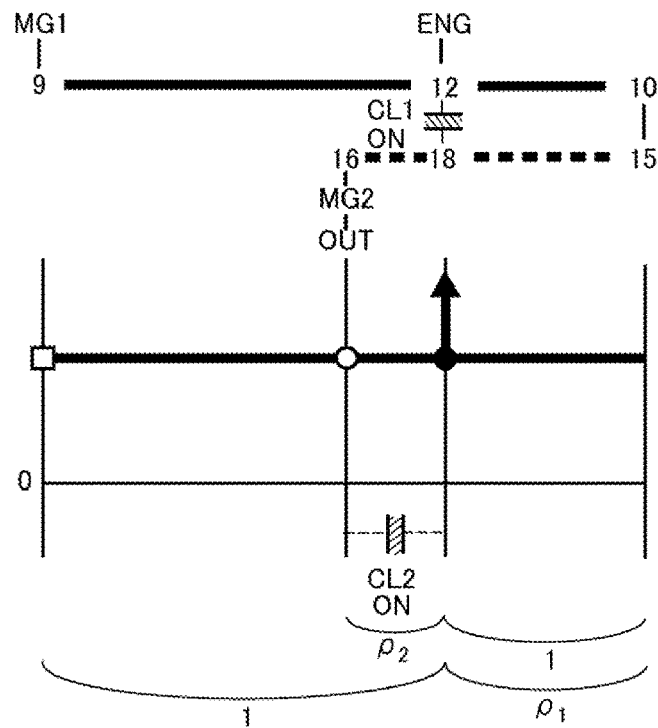
FIG. 6 is a nomographic diagram showing a situation in a fixed mode.

In the fixed mode, as indicated in FIG. 6, both of the first clutch CL1 and the second clutch CL2 are engaged so that all of the rotary elements in the power split mechanism 6 are rotated at a same speed. That is, the output power of the engine 2 is outputted entirely from the power split mechanism 6. In this situation, the output power of the engine 2 will not be translated into an electric energy by the first motor 3 and the second motor 4. For this reason, a power loss associated with such energy conversion will not be caused in the fixed mode and hence power transmission efficiency can be improved.

Figure 7:
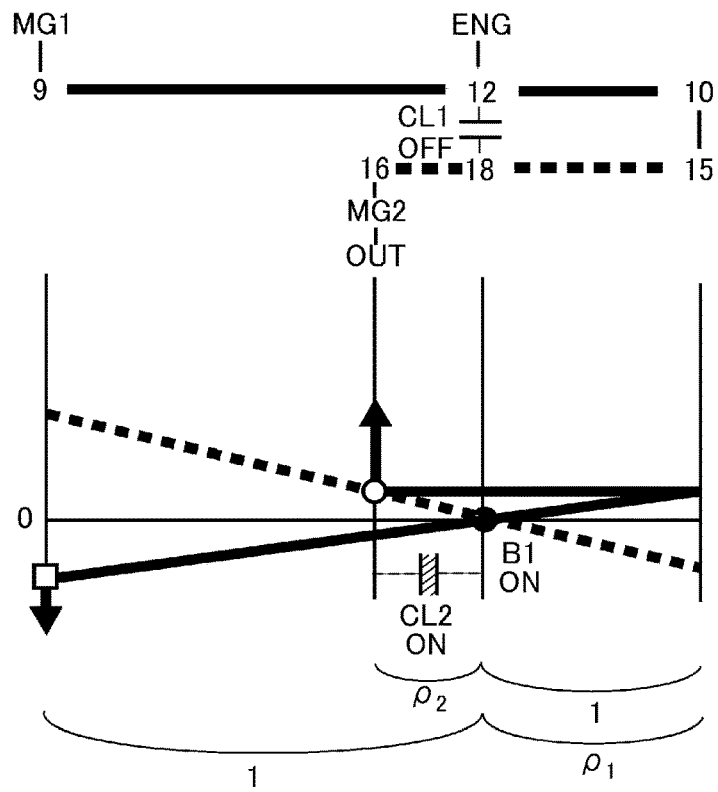
FIG. 7 is a nomographic diagram showing a situation in an EV-Hi mode.
Figure 8:
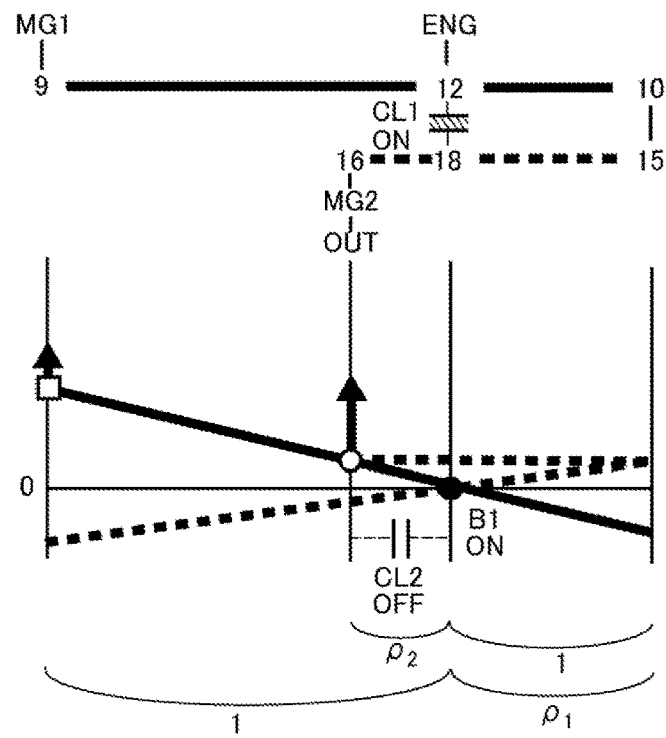
FIG. 8 is a nomographic diagram showing a situation in an EV-Lo mode.

As indicated in FIG. 7, in the EV-Hi mode, the hybrid vehicle 1 is propelled by drive torques generated by the first motor 3 and the second motor 4 while engaging the brake B1 and the second clutch CL2. In this case, the brake B1 establishes a reaction torque or a negative torque to restrict a rotation of the output shaft 13 or the carrier 12. In the EV-Hi mode, the first motor 3 is rotated in the opposite direction (i.e., in a reverse direction) to the rotational direction of the engine 2 in the HV mode, while generating torque in a direction to increase a rotational speed. As indicated in FIG. 8, in the EV-Lo mode, the hybrid vehicle 1 is propelled by the drive torques generated by the first motor 3 and the second motor 4 while engaging the brake B1 and the first clutch CL1. In this case, the brake B1 also establishes a reaction torque or a negative torque to restrict a rotation of the output shaft 13 or the carrier 12. In the EV-Lo mode, the first motor 3 is rotated in the same direction as the rotational direction of the engine 2 in the HV mode while generating torque in a direction to increase a rotational speed.

In the EV-Lo mode, a ratio of a rotational speed of the ring gear 16 of the transmission section 8 to a rotational speed of the first motor 3 is reduced smaller than that in the EV-Hi mode. That is, in the EV-Lo mode, the rotational speed of the first motor 3 at a predetermined speed is increased higher than that in the EV High mode. In other words, a speed reducing ratio in the EV-Lo mode is greater than that in the EV-Hi mode. In the EV-Lo mode, therefore, torque of the first motor 3 is delivered to the drive wheels 28R and 28L while being multiplied in comparison with the EV-Hi mode. In FIG. 7, the dashed-line represents an operating condition in the EV-Lo mode, and in FIG. 8, the dashed-line represents an operating condition in the EV-Hi mode.

Figure 9:
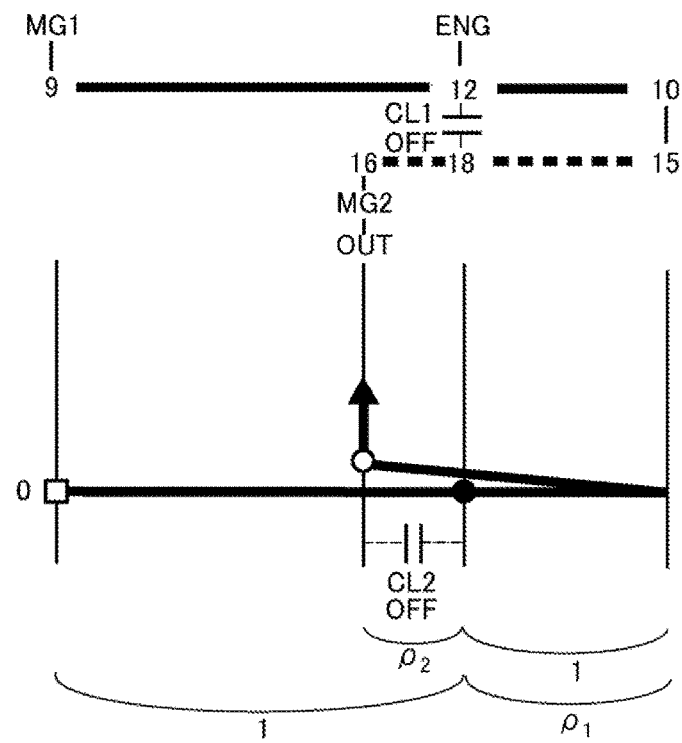
FIG. 9 is a nomographic diagram showing a situation in a single-motor mode.

As indicated in FIG. 9, in the single-motor mode, only the second motor 4 generates a drive torque, and both of the clutch CL1 and the second clutch CL2 are disengaged. In the single-motor mode, therefore, all of the rotary elements of the power split mechanism 6 are stopped. For this reason, the engine 2 and the first motor 3 will not be rotated passively, and hence the power loss can be reduced. As described, in the single-motor mode, any one of the first clutch CL1 and the second clutch CL2 may be engaged. In the following explanation, therefore, the single-motor mode in which both of the first clutch CL1 and the second clutch CL2 are disengaged will be called the "disconnecting mode".

A maximum driving force to propel the hybrid vehicle 1 and an energy consumption of the hybrid vehicle 1 vary depending on an operating condition of the hybrid vehicle 1. According to the embodiment of the present disclosure, therefore, the control system is configured to shift the operating mode depending on the operating condition of the hybrid vehicle 1.

Figure 10:
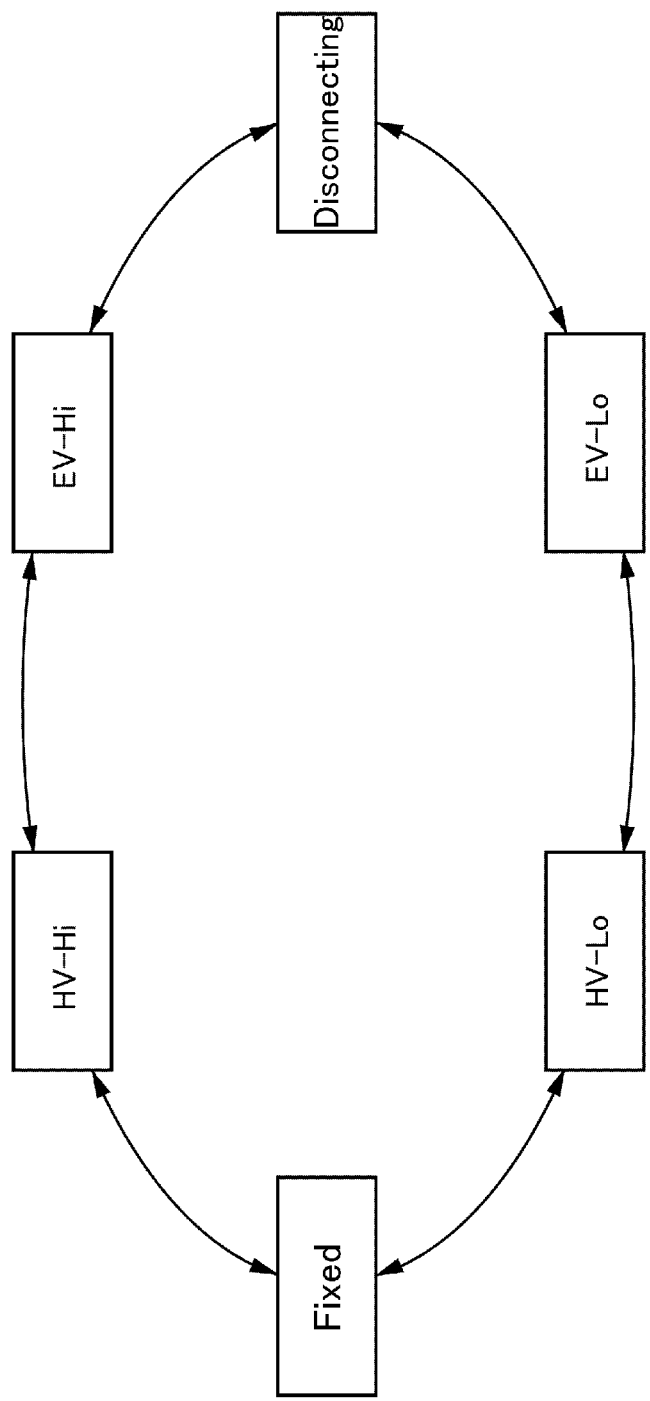
FIG. 10 is a schematic illustration showing a relation among operating modes.

In order to limit damages on the first clutch CL1, the second clutch CL2, and the brake B1, and to reduce a shock resulting from shifting the operating mode, an available operating mode possible to shift from the current operating mode is limited as shown in FIG. 10. Specifically, the operating modes can be shifted only to the adjoining modes in FIG. 10. In other words, the operating modes cannot be shifted to the operating modes other than the adjoining modes in FIG. 10.

Here will be explained an example of shifting the operating mode from the EV-Lo mode to the EV-Hi mode. As described, the EV-Lo mode is established by engaging the first clutch CL1 while disengaging the second clutch CL2. On the other hand, the EV-Hi mode is established by disengaging the first clutch CL1 while engaging the second clutch CL2. That is, the operating mode may be shifted from the EV-Lo mode to the EV-Hi mode by disengaging the first clutch CL1 while engaging the second clutch CL2.

In this situation, in the EV-Lo mode, an input speed to the second clutch CL2 and an output speed from the second clutch CL2 are different from each other. In other words, the carrier 18 and the ring gear 16 are rotated at different speeds. In this situation, therefore, the input speed and the output speed of the second clutch CL2 are synchronized with each other to limit damage on the second clutch CL2 and to reduce a shock. For example, the input speed and the output speed of the second clutch CL2 may be synchronized with each other by reducing the rotational speeds of the carrier 18 and the ring gear 16 to zero while disengaging the first clutch CL1. Instead, the input speed and the output speed of the second clutch CL2 may also be synchronized with each other while maintaining an engagement of the first clutch CL1. That is, the operating mode is temporarily shifted from the EV-Lo mode to the disconnecting mode or the HV-Lo mode.

In the case of shifting the operating mode from the EV-Lo mode to the disconnecting mode, the operating mode is further shifted to the EV-Hi mode by engaging the second clutch CL2. By contrast, in the case of shifting the operating mode from the EV-Lo mode to the HV-Lo mode, the operating mode is further shifted to the fixed mode by engaging the second clutch CL2. Thereafter, the operating mode is shifted to the HV-Hi mode by disengaging the first clutch CL1, and further shifted to the EV-Hi mode by stopping the engine 2. The operating mode may also be shifted from the EV-Hi mode to the EV-Lo mode, from the EV-Lo mode to the HV-Hi mode, or from the EV-Hi mode to the HV-Lo mode by the same procedures. That is, the operating mode may be shifted by the same procedures from the dual-motor mode in which one of the clutches is engaged and the other one of the clutches is disengaged, to the dual-motor mode in which one of the clutches is disengaged and the other one of the clutches is engaged, or to the HV mode.

Figure 11:
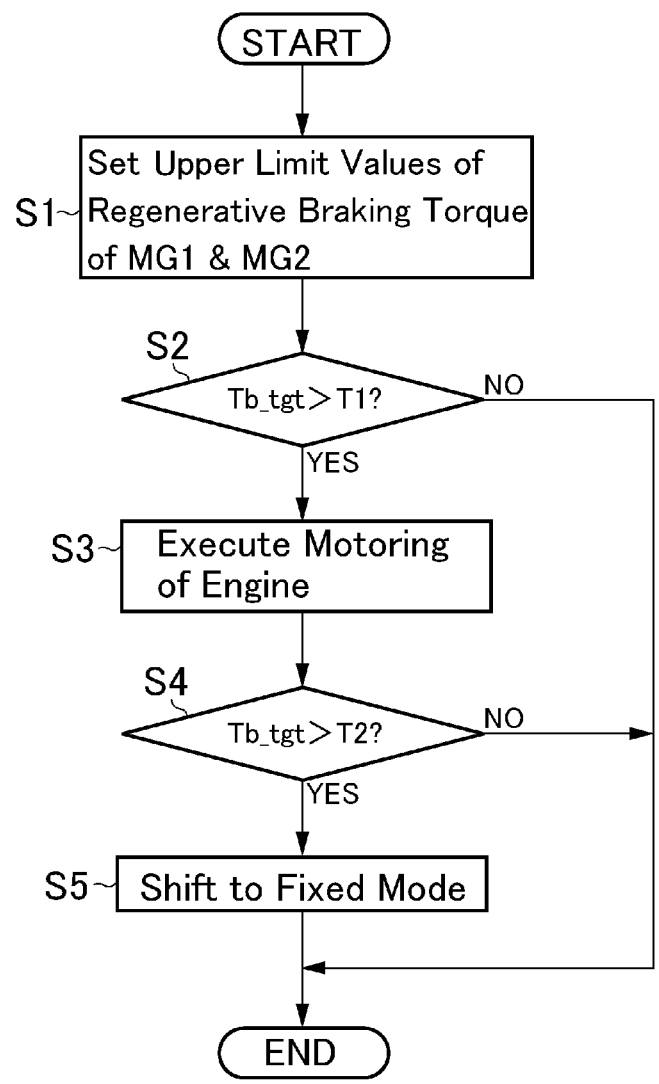
FIG. 11 is a flowchart showing one example of a routine for shifting the operating mode when a required braking torque of the prime mover cannot be achieved during deceleration of the vehicle in the EV-Hi mode.

The control system according to the embodiment of the present disclosure is configured to shift the operating mode from the dual-motor mode to an appropriate mode, upon satisfaction of a condition to shift the operating mode from the dual-motor mode. To this end, the control system executes routines shown in FIGS. 11 to 13. Specifically, FIG. 11 shows an example to shift the operating mode when a braking torque established by the prime mover, that is, a total torque of an engine braking torque and regenerative braking torques of the first motor 3 and the second motor 4 is insufficient, during propulsion in the EV-Hi mode. In other words, the total torque is a synthesized torque of the engine braking torque established by rotating the engine 2 passively, and the regenerative braking torques established by the first motor 3 and the second motor 4.

When the hybrid vehicle 1 is decelerated during propulsion in the EV-Hi mode while operating the first motor 3 and the second motor 4 as generators, electricity generated by the first motor 3 and the second motor 4 is accumulated in the battery 31. In this situation, if the SOC level of the battery 31 is raised to an upper limit level, the battery 31 may be damaged by an overcharging. In order to prevent such overcharging of the battery 31, when the SOC level of the battery 31 is raised to the upper limit level, the regenerative braking torques of the first motor 3 and the second motor 4 are restricted. Specifically, when operating the first motor 3 and the second motor 4 as generators, currents flow from the first motor 3 and the second motor 4 to the battery 31. In this situation, if temperatures of the battery 31, the first power control system 29, and the second power control system 30 are raised to upper limit levels, those elements may be damaged thermally. Therefore, in order to prevent excessive temperature rise in the battery 31, the first power control system 29, and the second power control system 30, generation of the regenerative braking torques of the first motor 3 and the second motor 4 is restricted when the temperatures of the battery 31, the first power control system 29, and the second power control system 30 are raised to the upper limit levels. In addition, an electric resistance in the battery 31 would be increased excessively when the temperature of the battery 31 falls below a lower limit level. In this case, therefore, the regenerative braking torques of the first motor 3 and the second motor 4 are also restricted.

If the regenerative braking torques of the first motor 3 and the second motor 4 are restricted, a required braking torque of the prime mover may not be achieved in the EV-Hi mode even if the required braking torque of the prime mover is constant. The regenerative braking torque is also restricted in the disconnecting mode due to the above-explained factors. In the disconnecting mode, therefore, a magnitude of the braking torque of the prime mover possible to apply to the drive wheels 28R and 28L is same as that in the EV-Hi mode. According to the routine shown in FIG. 11, therefore, the operating mode is shifted from the EV-Hi mode to the HV-Hi mode when the braking torque of the prime mover is insufficient, taking account of restriction of the regenerative braking torque of the second motor 4. A maximum braking torque of the prime mover in each of the HV-Lo mode, the HV-Hi mode, and the fixed mode varies depending on a vehicle speed, an upper limit speed of the engine 2, an upper limit speed of the power split mechanism 6 governed by the temperatures of the gears, an upper limit speed of the first motor 3, the SOC level of the battery 31 and so on. However, the routines will be explained on the assumption that the maximum braking torque of the prime mover is greatest in the HV-Lo mode, and the maximum braking torque of the prime mover in the fixed mode is greater than that in the HV-Hi mode.

In the routine shown in FIG. 11, at step S1, an upper limit value of each of the regenerative braking torques of the first motor 3 and the second motor 4 is set respectively for the purpose of determining whether a required braking torque of the prime mover can be established. Specifically, each of the upper limit values of the regenerative torques may be set based on an SOC level of the battery 31, and temperatures of the power control systems 29 and 30 and motors 3 and 4.

Then, it is determined at step S2 whether the required braking torque Tb_tgt of the prime mover is greater than a first predetermined torque T1. For example, the first predetermined torque T1 may be set to a same value as a maximum braking torque Tb of the prime mover in the EV-Hi mode, and may be calculated by adding a value calculated by multiplying the upper limit value of the regenerative braking torque of the first motor 3 by a gear ratio, to a value calculated by multiplying the upper limit value of the regenerative braking torque of the second motor 4 by a gear ratio. On the other hand, the required braking torque Tb_tgt of the prime mover may be calculated based on a required braking torque of the hybrid vehicle 1 obtained based on operations of an accelerator pedal and a brake pedal. Thus, at step S2, it is determined whether the required braking torque Tb_tgt of the prime mover can be achieved while maintaining the EV-Hi mode in a condition where the output torques of the first motor 3 and the second motor 4 are restricted.

If the required braking torque Tb_tgt of the prime mover is smaller than the first predetermined torque T1 so that the answer of step S2 is NO, the required braking torque Tb_tgt of the prime mover can be achieved while maintaining the EV-Hi mode, and hence the routine terminates. In this case, specifically, the hybrid vehicle 1 is decelerated by controlling the regenerative braking torques of the first motor 3 and the second motor 4 within the upper limit values to achieve the required braking torque Tb_tgt of the prime mover.

By contrast, if the required braking torque Tb_tgt of the prime mover is greater than the first predetermined torque T1 so that the answer of step S2 is YES, the routine progresses to step S3 to carry out a motoring of the engine 2. Specifically, a rotational speed of the first motor 3 is controlled in such a manner as to reduce the rotational speed of the first motor 3 or to reverse a rotational direction of the first motor 3 while maintaining engagement of the second clutch CL2. That is, the operating mode is shifted to the HV-Hi mode.

Then, it is determined at step S4 whether the required braking torque Tb_tgt of the prime mover is greater than a second predetermined torque T2. For example, the second predetermined torque T2 may be set to a same value as a maximum braking torque Tb of the prime mover in the HV-Hi mode. That is, at step S4, it is determined whether the required braking torque Tb_tgt of the prime mover can be achieved in the HV-Hi mode.

If the required braking torque Tb_tgt of the prime mover is smaller than the second predetermined torque T2 so that the answer of step S4 is NO, the routine terminates to maintain the HV-Hi mode. By contrast, if the required braking torque Tb_tgt of the prime mover is greater than the second predetermined torque T2 so that the answer of step S4 is YES, the routine progresses to step S5 to further shift the operating mode to the fixed mode.

Figure 12:
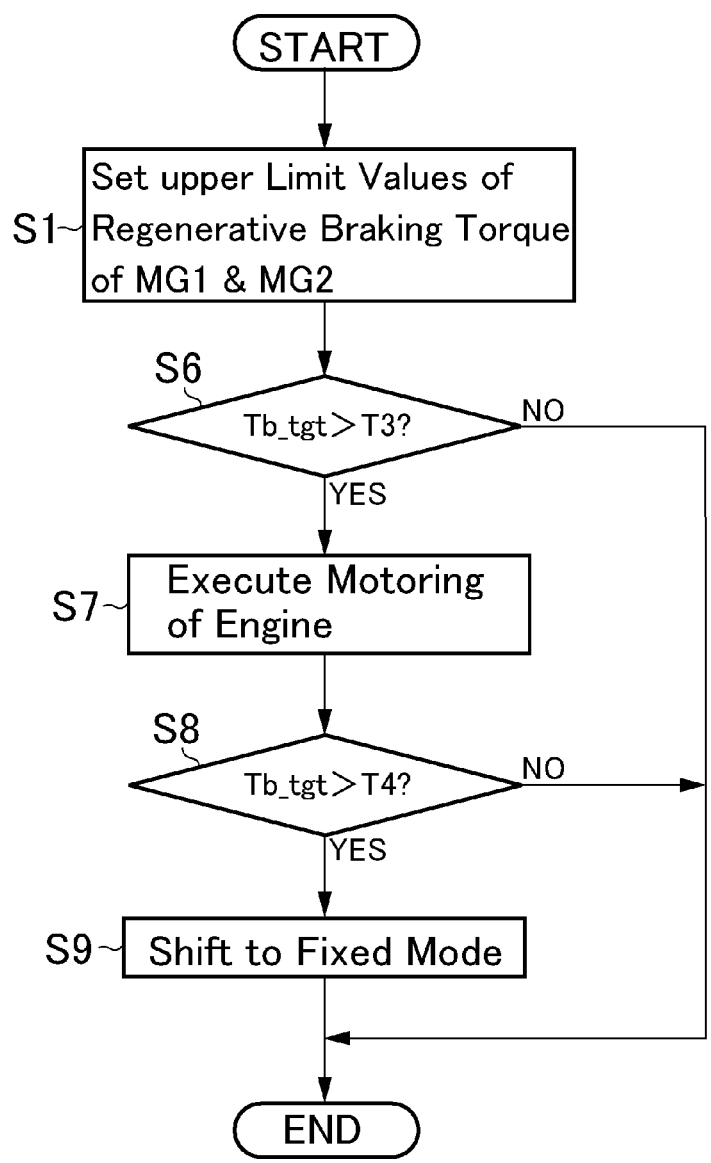
FIG. 12 is a flowchart showing one example of a routine for shifting the operating mode when a required braking torque of the prime mover cannot be achieved during deceleration of the vehicle in the EV-Lo mode.

Turning to FIG. 12, there is shown an example of the routine to be executed when decelerating the hybrid vehicle 1 while operating the first motor 3 and the second motor 4 as generators during propulsion in the EV-Lo mode. In the following explanations, explanation for the steps in common with those in the routine shown in FIG. 11 will be omitted. In the routine shown in FIG. 12, after executing step S1, it is determined at step S6 whether the required braking torque Tb_tgt of the prime mover is greater than a third predetermined torque T3. For example, the third predetermined torque T3 may be set to a same value as a maximum braking torque Tb of the prime mover in the EV-Lo mode, and may also be calculated by adding a value calculated by multiplying the upper limit value of the regenerative braking torque of the first motor 3 by a gear ratio, to a value calculated by multiplying the upper limit value of the regenerative braking torque of the second motor 4 by a gear ratio. That is, at step S6, it is determined whether the required braking torque Tb_tgt of the prime mover can be achieved while maintaining the EV-Lo mode. In other words, it is determined whether a shifting operation to the HV-Lo mode is required.

If the required braking torque Tb_tgt of the prime mover is smaller than the third predetermined torque T3 so that the answer of step S6 is NO, the required braking torque Tb_tgt of the prime mover can be achieved while maintaining the EV-Lo mode, and hence the routine terminates. In this case, specifically, the hybrid vehicle 1 is decelerated by controlling the regenerative braking torques of the first motor 3 and the second motor 4 within the upper limit values to achieve the required braking torque Tb_tgt of the prime mover.

By contrast, if the required braking torque Tb_tgt of the prime mover is greater than the third predetermined torque T3 so that the answer of step S6 is YES, the routine progresses to step S7 to carry out a motoring of the engine 2. Specifically, a rotational speed of the first motor 3 is controlled in such a manner as to reduce the rotational speed of the first motor 3 or to reverse a rotational direction of the first motor 3 while maintaining engagement of the first clutch CL1. That is, the operating mode is shifted to the HV-Lo mode.

Then, it is determined at step S8 whether the required braking torque Tb_tgt of the prime mover is smaller than a fourth predetermined torque T4. For example, the fourth predetermined torque T4 may be set to a same value as a maximum braking torque Tb of the prime mover in the fixed mode. That is, at step S6, it is determined whether the required braking torque Tb_tgt of the prime mover can be achieved in the fixed mode. In other words, it is determined whether a shifting operation to the fixed mode is required.

If the required braking torque Tb_tgt of the prime mover is greater than the fourth predetermined torque T4 so that the answer of step S8 is NO, the routine terminates to maintain the HV-Lo mode. By contrast, if the required braking torque Tb_tgt of the prime mover is smaller than the fourth predetermined torque T4 so that the answer of step S8 is YES, the routine progresses to step S9 to shift the operating mode to the fixed mode, and thereafter terminates.

Figure 13:
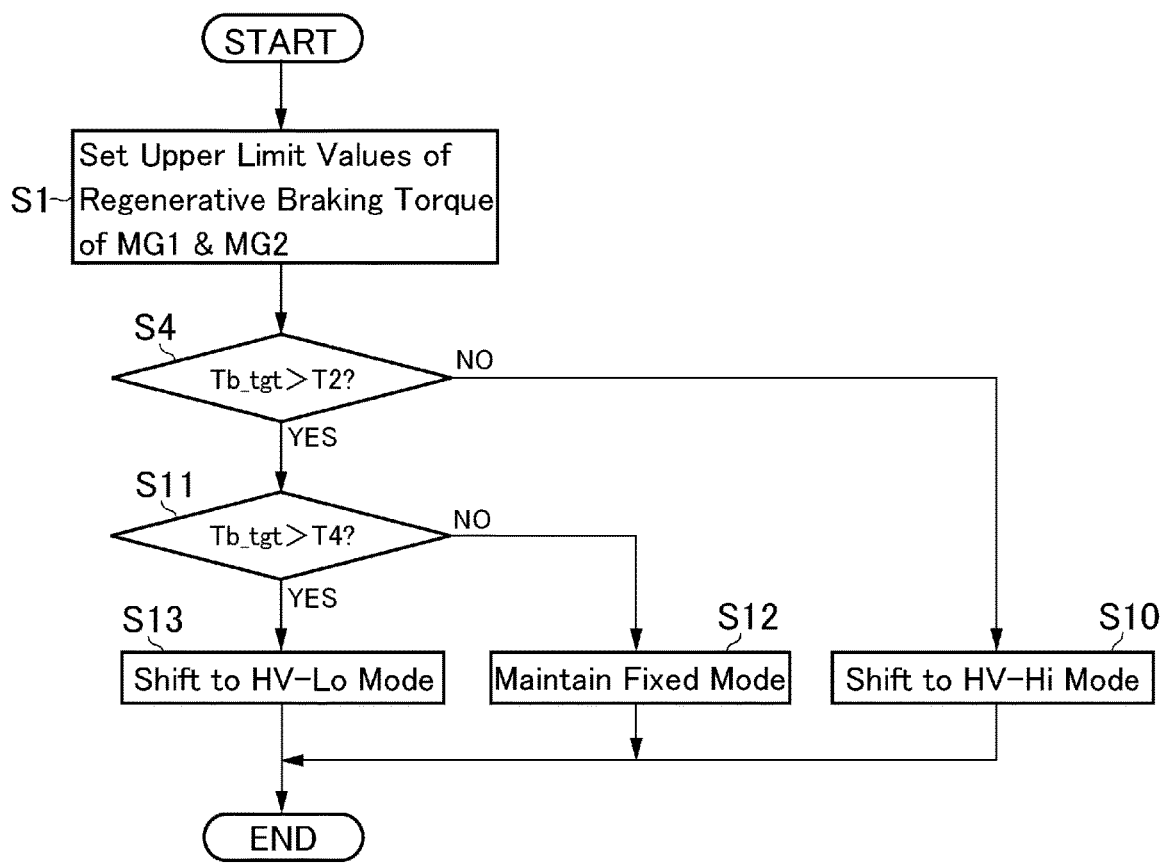
FIG. 13 is a flowchart showing one example of a routine for selecting the operating mode after shifting to the fixed mode.

In order to maintain the fixed mode, or to further shift the operating mode to the HV-Hi mode or to the HV-Lo mode after shifting the operating mode to the fixed mode at the above-explained steps S5 or S9, the control system according to the embodiment of the present disclosure is further configured to execute a routine shown in FIG. 13. In the routine shown in FIG. 13, the upper limit value of each of the regenerative braking torques of the first motor 3 and the second motor 4 is also set at step S1. Then, it is determined at step S4 whether the required braking torque Tb_tgt of the prime mover is greater than a second predetermined torque T2. That is, it is determined whether the required braking torque Tb_tgt of the prime mover can be achieved in the HV-Hi mode. Optionally, in order to prevent hunting between the shifting operation from the HV-Hi mode to the fixed mode and the shifting operation from the fixed mode to the HV-Hi mode, a hysteresis may be set respectively on the second predetermined torque T2 employed at step S4 of the routine shown in FIG. 11 and the second predetermined torque T2 employed at step S4 of the routine shown in FIG. 13.

If the required braking torque Tb_tgt of the prime mover is smaller than the second predetermined torque T2 so that the answer of step S4 is NO, the required braking torque Tb_tgt of the prime mover can be achieved even in the HV-Hi mode. In this case, therefore, the routine progresses to step S10 to shift the operating mode to the HV-HI mode, and thereafter terminates. By contrast, if the required braking torque Tb_tgt of the prime mover is greater than the second predetermined torque T2 so that the answer of step S4 is YES, the routine progresses to step S11 to determine whether the required braking torque Tb_tgt of the prime mover is greater than the fourth predetermined torque T4. That is, it is determined whether the required braking torque Tb_tgt of the prime mover can be achieved in the fixed mode. Optionally, in order to prevent hunting between the shifting operation from the HV-Lo mode to the fixed mode and the shifting operation from the fixed mode to the HV-Lo mode, a hysteresis may be set respectively on the fourth predetermined torque T4 employed at step S8 of the routine shown in FIG. 12 and the fourth predetermined torque T4 employed at step S8 of the routine shown in FIG. 13.

If the required braking torque Tb_tgt of the prime mover is smaller than the fourth predetermined torque T4 so that the answer of step S11 is NO, the required braking torque Tb_tgt of the prime mover can be achieved even in the fixed mode. In this case, therefore, the routine progresses to step S12 to maintain the fixed mode, and thereafter terminates. By contrast, if the required braking torque Tb_tgt of the prime mover is greater than the fourth predetermined torque T4 so that the answer of step S11 is YES, the routine progresses to step S13 to shift the operating mode to the HV-Lo mode, and thereafter terminates.

Figure 14:
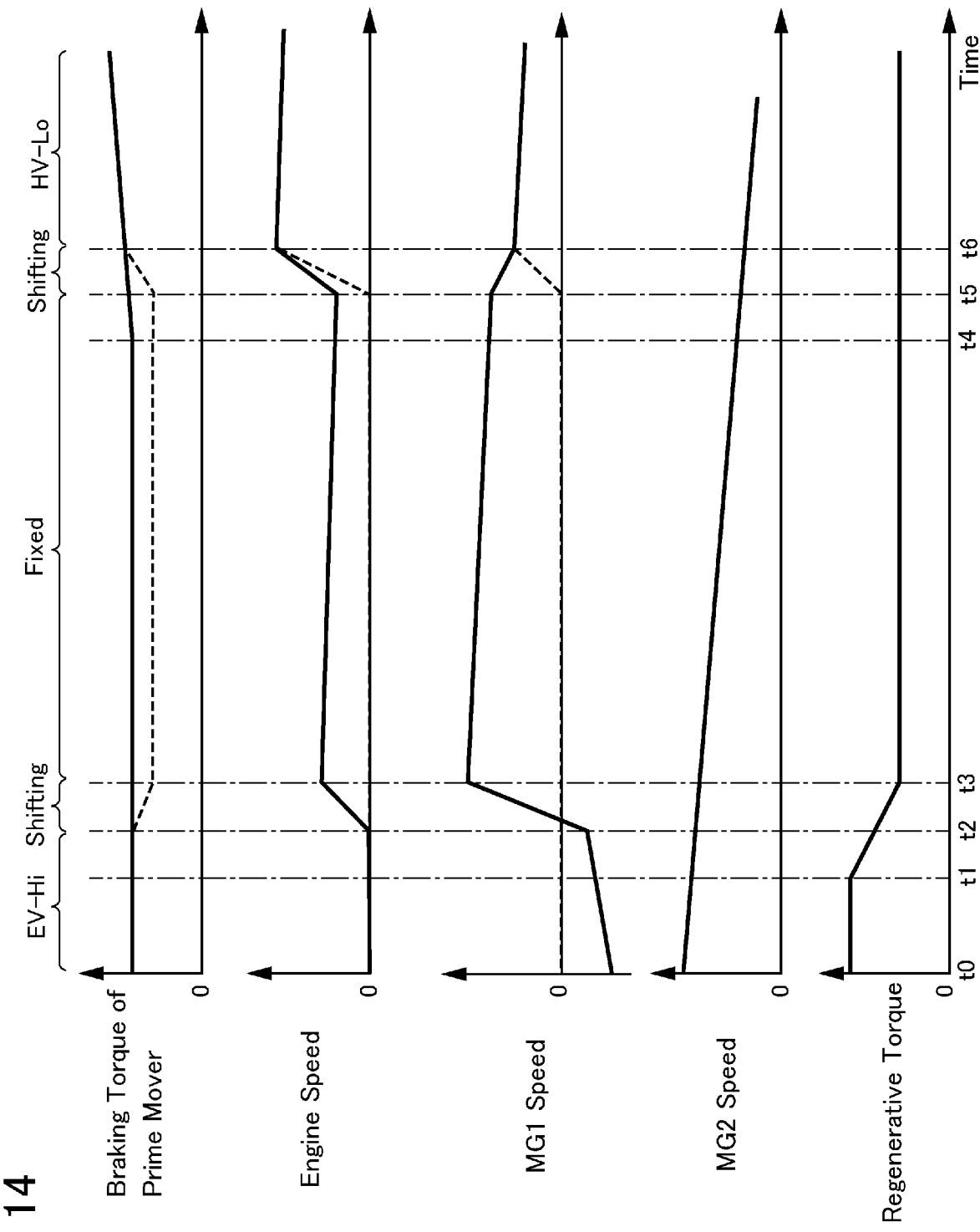
FIG. 14 is a time chart showing a temporal change in the operating mode in a situation where the hybrid vehicle is decelerated in the EV-Hi mode and the regenerative torque of the second motor is restricted, and then a required deceleration is increased.

FIG. 14 shows a change in the operating mode in a situation where the required braking torque of the prime mover cannot be achieved due to restriction on the regenerative braking torque of the second motor 4 during deceleration of the hybrid vehicle 1 in the EV-Hi mode, and then a required deceleration is increased. At point t0, the hybrid vehicle 1 is propelled in the EV-Hi mode while establishing a regenerative braking torque by the second motor 4. In this situation, the engine 2 is stopped and the first motor 3 is rotated at a speed in accordance with a vehicle speed and a speed ratio of the power split mechanism 6. Specifically, the first motor 3 is rotated in a direction opposite to a rotational direction of the second motor 4, and the regenerative braking torque may also be established by the first motor 3.

At point t1, the regenerative braking force of the second motor 4 is restricted, and hence the regenerative braking torque of the second motor 4 is reduced gradually from point t1. Then, at point t2, the required braking torque Tb_tgt of the prime mover may no longer be achieved and hence a shifting of the operating mode is required. Consequently, the rotational speed of the first motor 3 is controlled in such a manner as to reduce the rotational speed toward zero, or to reverse the rotational direction of the first motor 3. As a result, a speed of the engine 2 starts increasing from point t2. In this situation, the required braking torque Tb_tgt of the prime mover may not be achieved by the maximum braking torque of the prime mover in the HV-Hi mode. Therefore, an affirmative determination is made at step S4, and the engine speed is controlled in such a manner as to achieve a target speed at which the first clutch CL1 can be engaged.

Then, at point t3, the first clutch CL1 is engaged to establish the fixed mode. In the example shown in FIG. 14, the required braking torque Tb_tgt of the prime mover at the point when the operating mode is shifted to the fixed mode may be achieved by the braking torque of the prime mover possible to be generated in the fixed mode. Therefore, the operating mode is not shifted immediately from the fixed mode to the HV-Lo mode, and the fixed mode is maintained in this situation.

Then, at point t4, the required braking torque Tb_tgt of the prime mover starts increasing, and at point t5, the required braking torque Tb_tgt of the prime mover reaches a magnitude which cannot be achieved by the maximum braking torque of the prime mover in the fixed mode. Therefore, an affirmative determination is made at step S11 of the routine shown in FIG. 13, and the shifting operation to the HV-Lo mode is commenced to disengage the second clutch CL2. At the same time, a speed of the engine 2 is increased by reducing a speed of the first motor 3. Thereafter, at point t6, the engine speed is increased to a speed at which a total torque of the regenerative braking torque of the second motor 4 and the engine braking torque established by rotating the engine 2 passively reaches the required braking torque Tb_tgt of the prime mover. As a result, the shifting operation to the HV-Lo mode is completed.

In FIG. 14, the dashed lines respectively indicate changes in a braking torque of the prime mover, a speed of the engine 2, and a speed of the first motor 3 of a case in which the operating mode is shifted to the disconnecting mode at point t2 to be further shifted to the HV-Lo mode. In this case, the required braking torque Tb_tgt of the prime mover cannot be achieved from point t2.

Thus, in the case that the required braking torque Tb_tgt of the prime mover cannot be achieved in the EV-Hi mode due to restriction on the regenerative torque of the second motor 4, the required braking torque Tb_tgt of the prime mover can be achieved by shifting the operating mode to the HV-HI mode to rotate the engine 2 passively thereby establishing the engine braking torque. In other words, the operating mode can be shifted while preventing an increase in a difference between the required braking torque Tb_tgt of the prime mover and an actual braking torque of the prime mover. According to the embodiment of the present disclosure, therefore, a temporal drop in the braking torque can be prevented during a transitional state of the shifting operation of the operating mode. In addition, the engine speed can be controlled appropriately in the HV-Lo mode and the HV-Hi mode. For this reason, noises of the engine 2 and the gear train of the power split mechanism 6 can be reduced.

The output torque of the second motor 4 may also be restricted when the SOC level of the battery 31 falls to the lower limit level, or when the temperature of the battery 31 is raised excessively. According to the embodiment of the present disclosure, the operating mode may be shifted while achieving a required acceleration by the foregoing procedures also in those cases.

Given that the one-way clutch is adopted as the brake B1, torque may be applied to the one-way clutch inversely from the drive wheels 28R and 28L when the hybrid vehicle 1 travels e.g., on a bumpy road. In other words, the one-way clutch may be subjected to torque pulse. In this situation, the one-way clutch may be engaged by the torque pulse applied thereto in a direction to increase the engine speed, and may be disengaged by the torque pulse applied thereto in a direction to decrease the engine speed. Consequently, the one-way clutch may be damaged by such cyclic load or impulse load.

Figure 15:
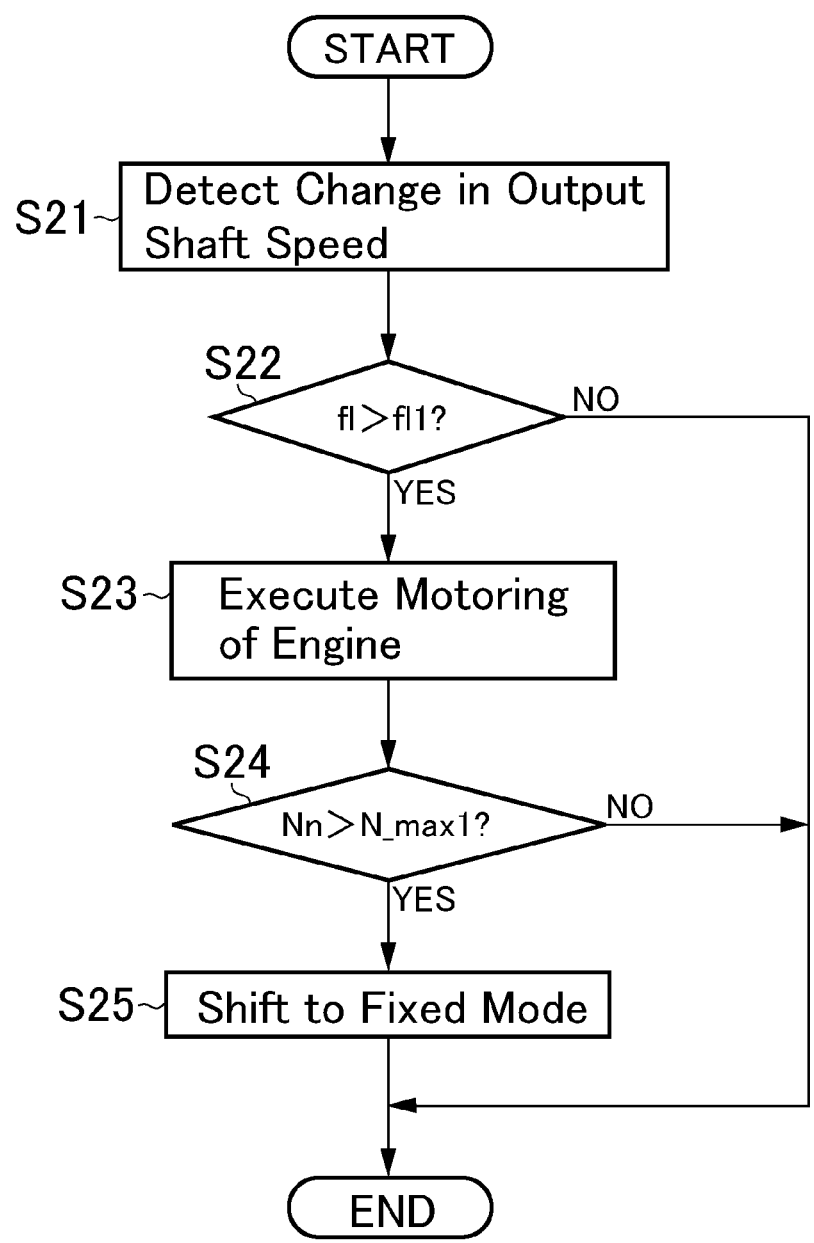
FIG. 15 is a flowchart showing one example of a routine for shifting the operating mode when a torque is applied inversely during propulsion in the EV-Hi mode.
Figure 16:
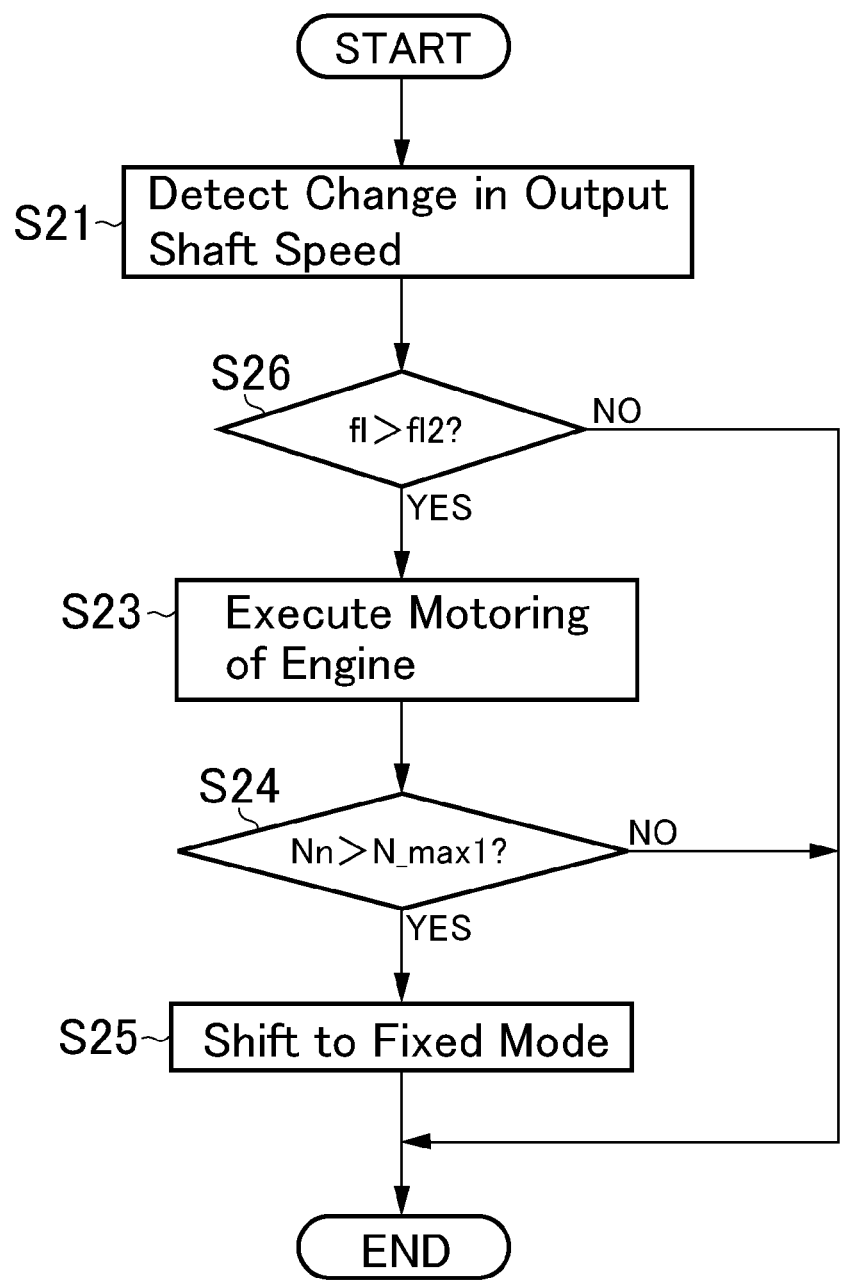
FIG. 16 is a flowchart showing one example of a routine for shifting the operating mode when a torque is applied inversely during propulsion in the EV-Lo mode.
Figure 17:
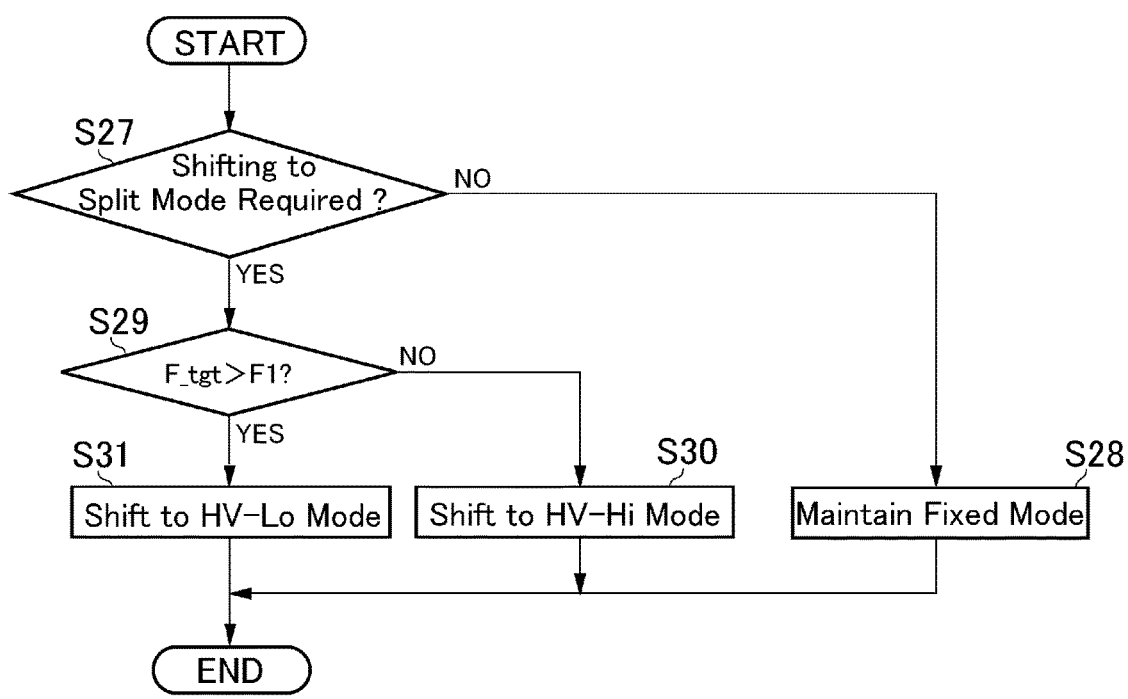
FIG. 17 is a flowchart showing another example of a routine for selecting the operating mode after shifting to the fixed mode.

In order to avoid such disadvantage, according to the embodiment of the present disclosure, the control system is further configured to shift the operating mode to the HV mode when the torque is delivered inversely from the wheels during propulsion in the dual-motor mode. Examples of the routine for such control are shown in FIGS. 15 to 17. FIG. 15 shows a routine executed during propulsion in the EV-Hi mode. According to the routine shown in FIG. 15, first of all, a change in a speed of the output shaft such as the driveshaft 27 or the counter shaft 20 is detected at step S21. According to the present disclosure, definition of the "change in a speed of the output shaft" is a variation width of a speed of the output shaft. For example, such change in a speed of the output shaft may be detected by a dedicated sensor or the wheel speed sensor.

Then, it is determined at step S22 whether the change fl in a speed of the output shaft detected at step S21 is greater than a first threshold value fl1. For example, the first threshold value fl1 may be set based on the torque applied to the one-way clutch and rigidity of the one-way clutch. Specifically, the first threshold value fl1 is set to a value at which the torque applied to the one-way clutch is smaller than a maximum allowable torque of the one-way clutch. If the change fl in a speed of the output shaft is smaller than the first threshold value fl1 so that the answer of step S22 is NO, the one-way clutch may not be subjected to the excessive torque. In this case, therefore, the routine terminates.

By contrast, if the change fl in a speed of the output shaft is greater than the first threshold value fl1 so that the answer of step S22 is YES, the routine progresses to step S23 to carry out a motoring of the engine 2. That is, a determination to shift the operating mode is made at step S22. Specifically, in the case that the answer of step S22 is YES, this means that a shifting of the operating mode to rotate the engine 2 is required. In this case, a speed of the engine 2 is controlled in such a manner that the one-way clutch will not be engaged even if the speed of the engine 2 is fluctuated by the change in the speed of the output shaft.

Then, it is determined whether the hybrid vehicle 1 can be propelled while maintaining the HV-HI mode. In other words, a demand to shift the operating mode is determined.

To this end, specifically, it is determined at step S24 whether a rotational speed Nn of any one of the engine 2, the first motor 3, and the rotary elements and the rotary members of the power split mechanism 6 is higher than a first allowable speed N_max1 set individually for those members and elements. Each of the first allowable speeds N_max1 may be not only a fixed value but also a variable which is changed depending on a temperature etc.

If the rotational speeds of all of the above-mentioned members and elements are lower than the first allowable speeds N_max1 of those members and elements so that the answer of step S24 is NO, the routine terminates to maintain the HV-HI mode. By contrast, if the rotational speed of at least any one of the above-mentioned members and elements is higher than the first allowable speed N_max1 thereof so that the answer of step S24 is YES, the routine progresses to step S25 to shift the operating mode to the fixed mode, and thereafter terminates. Consequently, the member or element rotated at a speed higher than the first allowable speed N_max1 thereof can be prevented from being damaged.

Turning to FIG. 16, there is shown a routine executed during propulsion in the EV-Lo mode. In the following explanations, explanation for the steps in common with those in the routine shown in FIG. 15 will be omitted. In the routine shown in FIG. 16, after executing step S21, it is determined at step S26 whether the change fl in a speed of the output shaft detected at step S21 is greater than a second threshold value fl2. For example, the second threshold value fl2 may also be set by the same principle as the first threshold value fl1. In the EV-Lo mode, the torque applied inversely to the one-way clutch is smaller than the torque applied inversely to the one-way clutch in the EV-Hi mode. Therefore, the second threshold value fl2 may be set to a value greater than the first threshold value fl1.

If the change fl in a speed of the output shaft is smaller than the second threshold value fl2 so that the answer of step S26 is NO, the one-way clutch may not be subjected to the excessive torque. In this case, therefore, the routine terminates to maintain the EV-Lo mode. By contrast, if the change fl in a speed of the output shaft is greater than the second threshold value fl2 so that the answer of step S26 is YES, the routine progresses to step S23 to carry out a motoring of the engine 2. That is, a determination to shift the operating mode is made at step S26. Specifically, in the case that the answer of step S26 is YES, this means that a shifting of the operating mode to rotate the engine 2 is required.

Then, it is determined at step S24 whether a rotational speed Nn of any one of the engine 2, the first motor 3, and the rotary elements and the rotary members of the power split mechanism 6 is higher than the first allowable speed N_max1. If the answer of step S24 is NO, the routine terminates to maintain the HV-HI mode. By contrast, if the answer of step S24 is YES, the routine progresses to step S25 to shift the operating mode to the fixed mode, and thereafter terminates.

In order to maintain the fixed mode, or to further shift the operating mode to the HV-Hi mode or to the HV-Lo mode after shifting the operating mode to the fixed mode at the above-explained step S25 of the routines shown in FIGS. 15 and 16, the control system according to the embodiment of the present disclosure is further configured to execute a routine shown in FIG. 17. In the routine shown in FIG. 17, first of all, it is determined at step S27 whether it is required to shift the operating mode to a split mode such as the HV-Hi mode and the HV-Lo mode. For example, the operating mode is required to be shifted to the split mode when a rotational speed of the engine 2 falls below a self-sustaining speed at which the engine 2 is allowed to rotate autonomously, or when a rotational speed of the engine 2 raised higher than an upper limit speed.

If it is not required to shift the operating mode to the split mode so that the answer of step S27 is NO, the routine progresses to step S28 to maintain the fixed mode, and thereafter terminates. By contrast, if it is required to shift the operating mode to the split mode so that the answer of step S27 is YES, the routine progresses to step S29 to determine whether a required driving force F_tgt is greater than a first predetermined driving force F1. For example, the first predetermined driving force F1 may be set with reference to a map for selecting the operating mode in accordance with a vehicle speed and a required driving force. Specifically, the first predetermined driving force F1 may be set to a value smaller than a maximum driving force in the HV-Hi mode.

If the required driving force F_tgt is smaller than the first predetermined driving force F1 so that the answer of step S29 is NO, the routine progresses to step S30 to shift the operating mode to the HV-Hi mode, and thereafter terminates. By contrast, if the required driving force F_tgt is greater than the first predetermined driving force F1 so that the answer of step S29 is YES, the routine progresses to step S31 to shift the operating mode to the HV-Lo mode, and thereafter terminates.

Figure 18:
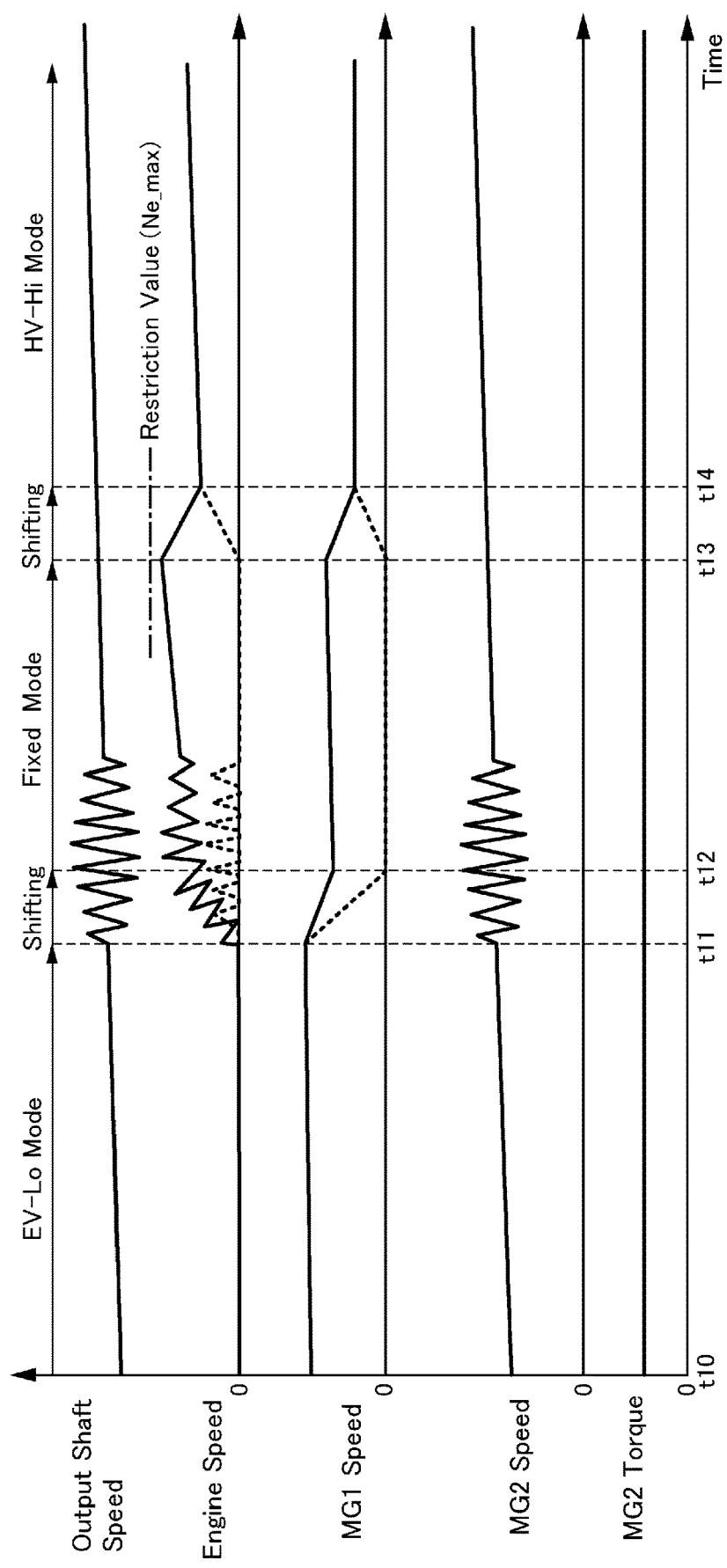
FIG. 18 is a time chart showing a temporal change in the operating mode in a situation where the hybrid vehicle travels on a bumpy road in the EV-Lo mode.

FIG. 18 shows a change in the operating mode when the hybrid vehicle 1 travels on a bumpy road in the EV-Lo mode. At point t10, the hybrid vehicle 1 is propelled in the EV-Lo mode by a drive torque generated by the first motor 3 and the second motor 4. In this situation, the engine 2 is stopped and the one-way clutch is engaged. The first motor 3 is rotated at a speed in accordance with a vehicle speed and a speed ratio of the power split mechanism 6.

The hybrid vehicle 1 starts travelling on a bumpy road from point t11 and hence the drive wheels 28R and 28L are gripped and slip alternately and repeatedly. Consequently, a rotational speed of each of the drive wheels 28R and 28L individually connected to the output shaft is fluctuated. As a result, a rotational speed of the second motor 4 is also fluctuated. At point t11, an affirmative determination is made at step S26 of the routine shown in FIG. 16 so that the motoring of the engine 2 is carried out. To this end, a rotational speed of the first motor 3 is maintained to a predetermined speed. In this situation, if the rotational speeds of the drive wheels 28R and 28L are fluctuated, the rotational speed of the first motor 3 is maintained but the rotational speed of the engine 2 is fluctuated. Therefore, the rotational speed of the engine 2 is fluctuated from point t11.

For example, when a rotational speed Ne of the engine 2 exceeds an allowable speed Ne_max during execution of the motoring of the engine 2, an affirmative determination is made at step S24, and the operating mode is shifted to the fixed mode. In the example shown in FIG. 18, the determination to shift the operating mode to the fixed mode is made during execution of the motoring of the engine 2, and a shifting operation to the fixed mode is completed at point t12.

In the example shown in FIG. 18, the hybrid vehicle 1 is accelerated mildly, and a determination to shift the operating mode to the split mode is made at point t13 when the rotational speed Ne of the engine 2 reaches the allowable speed (or a restriction value) Ne_max. Consequently, the operating mode is shifted to the HV-Hi mode by disengaging the first clutch CL1. In this situation, a rotational speed of the first motor 3 is controlled to control the engine speed Ne in an optimally fuel efficient manner. To this end, specifically, the rotational speed of the first motor 3 is reduced to reduce the engine speed Ne. Then, at point t14, the engine speed Ne reaches the target speed and the shifting operation to the HV-Hi mode is completed.

In FIG. 18, the dashed lines respectively indicate changes in rotational speeds of the engine 2 and the first motor 3 of a case in which the operating mode is shifted to the disconnecting mode at point t11. In this case, the engine speed Ne fluctuates between a predetermined speed and 0 and hence the one-way clutch may be subjected to an excessive torque.

Thus, when the hybrid vehicle 1 travels on a bumpy road in the dual-motor mode, the one-way clutch can be prevented from being subjected to an excessive torque. For this reason, damage on the one-way clutch can be limited.

Given that the one-way clutch is adopted as the brake B1, when the operating mode is shifted from the EV-Lo mode to the EV-Hi mode or the HV-Hi mode via the disconnecting mode, or from the EV-Hi mode to the EV-Lo mode or the HV-Hi mode via the disconnecting mode, the engine 2 may be rotated unintentionally in accordance with an angular acceleration of the first motor 3. That is, the operating mode may not be shifted promptly from the dual-motor mode to the mode to be established by engaging another clutch via the disconnecting mode.

Figure 19:
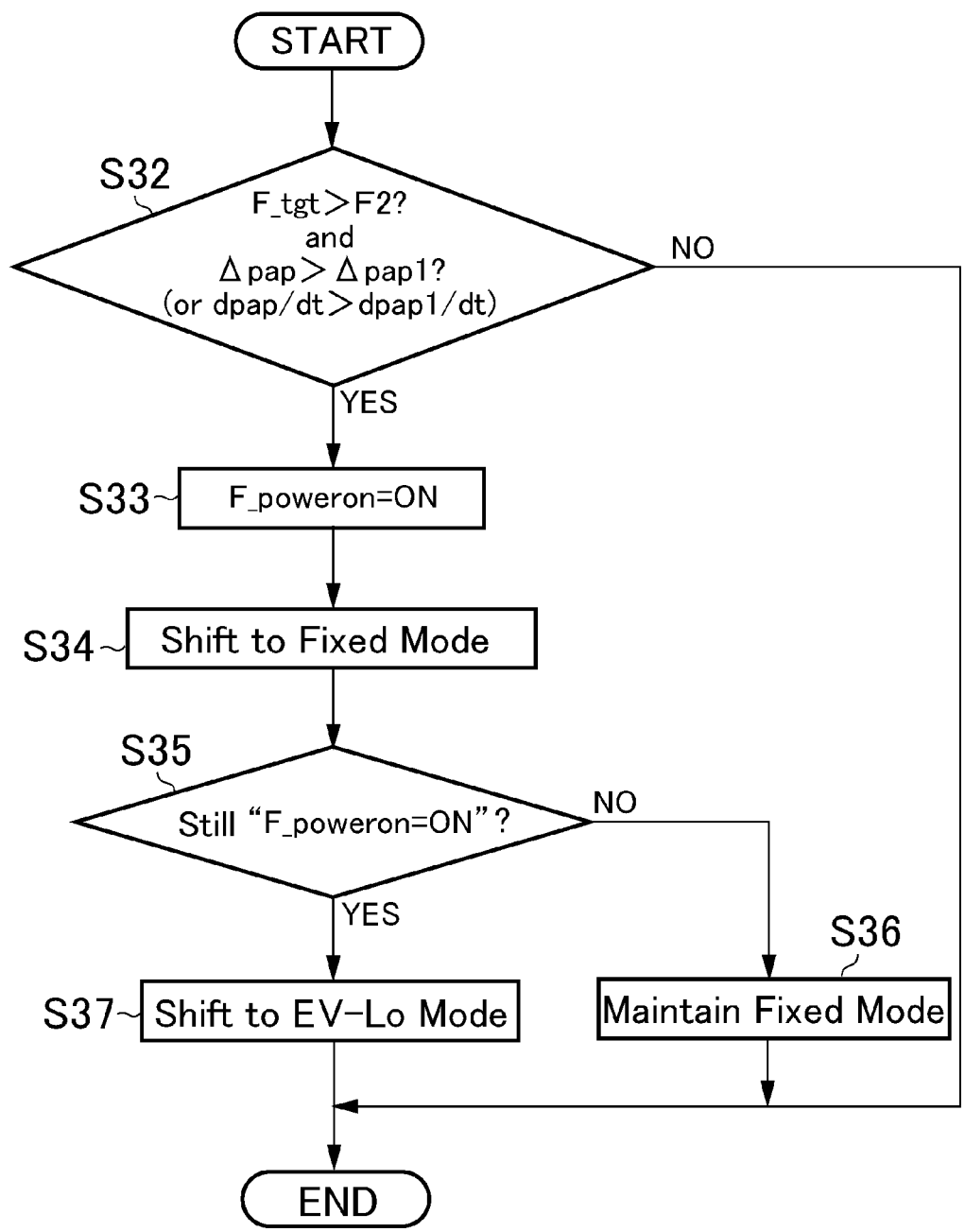
FIG. 19 is a flowchart showing one example of a routine for shifting the operating mode promptly from the EV-Hi mode to the EV-Lo mode when an abrupt acceleration is required.

In order to avoid such disadvantage, according to the embodiment of the present disclosure, the control system is further configured to shift the operating mode from the dual-motor mode to the mode to be established by engaging another clutch via the fixed mode, if it is necessary to shift the operating mode promptly from the dual-motor mode to the mode to be established by engaging another clutch. That is, when it is required to complete a shifting operation between the EV-Hi mode and the EV-Lo mode within a predetermined period of time, the control system shifts the operating mode between the EV-Hi mode and the EV-Lo mode via the fixed mode. An example of the routine for such control is shown in FIG. 19. According to the routine shown in FIG. 19, first of all, it is determined at step S32 whether a required driving force F_tgt is greater than a second predetermined driving force F2, and whether a change amount Δpap in a position of the accelerator pedal is greater than a predetermined value Δpap1, or whether a change rate dpap/dt of a position of the accelerator pedal is greater than a predetermined value dpap1/dt. That is, at step S32, it is determined whether an abrupt acceleration by shifting from the EV-Hi mode to the EV-Lo mode is required. In other words, at step S32, it is determined whether the shifting operation from the EV-Hi mode to the EV-Lo mode has to be completed within the predetermined period of time. To this end, the second predetermined driving force F2 is set to a value smaller than a predetermined value of a required driving force for determining an execution of a shifting of the operating mode from the EV-Hi mode to the EV-Lo mode. On the other hand, the predetermined value Δpap1 of the change amount Δpap, and the predetermined value dpap1/dt of the change rate dpap/dt are set to values possible to determine a demand of abrupt acceleration based on a change amount and a change rate of a position of the accelerator pedal found by experiments.

If the required driving force F_tgt is smaller than the second predetermined driving force F2, or the change amount Δpap in a position of the accelerator pedal or the change rate dpap/dt of a position of the accelerator pedal is smaller than the predetermined value Δpap1 or dpap1/dt so that the answer of step S32 is NO, the routine terminates to maintain the EV-Hi mode. By contrast, if the required driving force F_tgt is greater than the second predetermined driving force F2, and the change amount Δpap in a position of the accelerator pedal or the change rate dpap/dt of a position of the accelerator pedal is greater than the predetermined value Δpap1 or dpap1/dt so that the answer of step S32 is YES, the routine progresses to step S33 to turn on a flag F_poweron representing a fact that the required driving force is large, and further progresses to step S34 to shift the operating mode to the fixed mode. In this situation, specifically, the engine 2 is cranked by the first motor 3 to synchronize an input speed of the first clutch CL1 with an output speed of the first clutch CL1, and the first clutch CL1 is engaged when the input speed of the first clutch CL1 is synchronized with the output speed of the first clutch CL1.

Then, it is determined at step S35 whether the flag F_poweron is still turned on. If the flag F_poweron has been turned off so that the answer of step S35 is NO, the routine progresses to step S36 to maintain the fixed mode, and thereafter terminates. By contrast, if the flag F_poweron is still turned on so that the answer of step S35 is YES, the routine progresses to step S37 to shift the operating mode to the EV-Lo mode, and thereafter terminates. Specifically, the engine 2 is stopped by the first motor 3 while disengaging the second clutch CL2, and thereafter generating a driving torque by the first motor 3. When the position of the accelerator pedal pap is maintained to a constant position, or when the change amount Δpap in a position of the accelerator pedal is reduced, the flag F_poweron is turned off.

Figure 20:
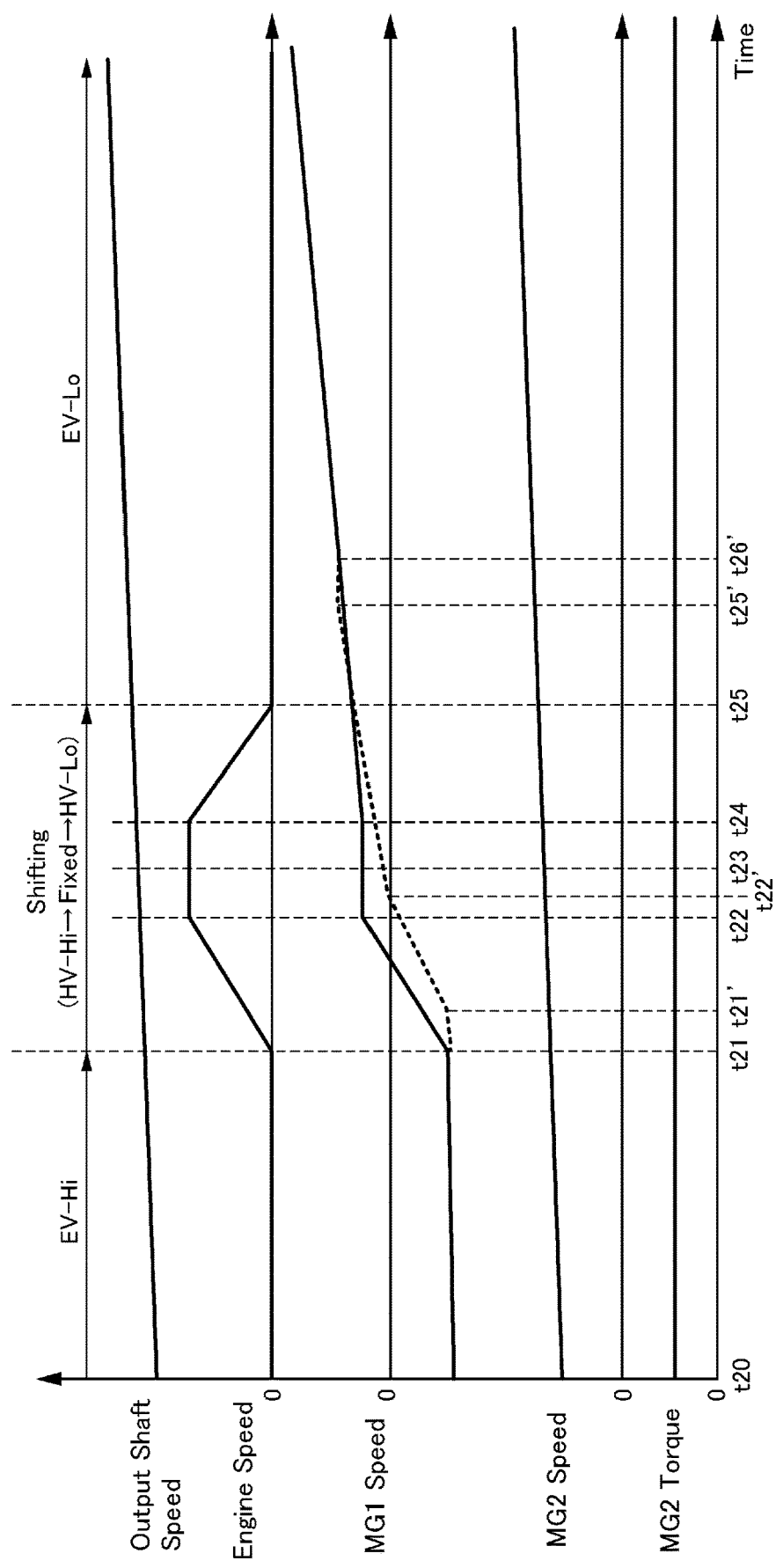
FIG. 20 is a time chart showing a temporal change in the operating mode in a situation where an abrupt acceleration is required during acceleration of the hybrid vehicle in the EV-Hi mode.

FIG. 20 shows a change in the operating mode when an abrupt acceleration is required during accelerating the hybrid vehicle 1 in the EV-HI mode. At point t20, the hybrid vehicle 1 is propelled in the EV-Hi mode by a drive torque generated by the second motor 4. In this situation, the engine 2 is stopped, and the first motor 3 is rotated at a speed in accordance with a vehicle speed and a speed ratio of the power split mechanism 6. Specifically, the first motor 3 is rotated in a direction opposite to a rotational direction of the second motor 4, and it is possible to generate a driving torque by the first motor 3.

An abrupt acceleration is required at point t21 and an affirmative determination is made at step S32. Consequently, the operating mode is shifted to the fixed mode. Specifically, the engine 2 is cranked by the first motor 3 thereby reducing a speed difference between the input speed and the output speed of the first clutch CL1. In this situation, since the operating mode can be shifted to the fixed mode while controlling a rotational speed of the engine 2, a change rate of a rotational speed of the first motor 3 can be increased. Here, the HV-Hi mode is temporarily established during the process of the shifting to the fixed mode from point t20.

When the input speed of the first clutch CL1 is synchronized with the output speed of the first clutch CL1 at point t22, the first clutch CL1 is engaged, and the shifting operation to the fixed mode is completed at point t23. In the example shown in FIG. 20, the abrupt acceleration is required continuously, and hence the operating mode has to be further shifted to the EV-Lo mode immediately after shifting the operating mode to the fixed mode. For this purpose, the second clutch CL2 is disengaged from point t23.

Then, when the second clutch CL2 is disengaged completely at point t24, the engine 2 starts to be stopped by controlling a speed of the first motor 3, and the engine 2 is stopped completely and the shifting operation to the EV-Lo mode is completed at point t25. In this situation, since rotational speed of the engine 2 is controlled by the first motor 3, a change rate of the rotational speed of the first motor 3 can be increased.

In FIG. 20, the dashed line indicates a change in a speed of the first motor 3 of a case in which the operating mode is shifted from the EV-Hi mode to the HV-Lo via the disconnecting mode. In this case, disengagement of the second clutch CL2 is commenced at point t21, and the disengagement of the second clutch CL2 is completed at point t21'. In this case, therefore, the speed of the first motor 3 is changed from point t21' to reduce a difference between the input speed and the output speed of the first clutch CL1. In this situation, if a change rate of a speed of the first motor 3 is increased, the engine 2 may be rotated unintentionally and hence a speed of the engine 2 may not be controlled. For this reason, as indicated in FIG. 20, the change rate of a speed of the first motor 3 is smaller in the case of shifting the operating mode from the EV-Hi mode to the HV-Lo via the disconnecting mode, compared to the case of shifting the operating mode from the EV-Hi mode to the HV-Lo via the fixed mode.

The first motor 3 is stopped temporarily at point t22', and then, a rotational direction of the first motor 3 is reversed and a speed of the first motor 3 is increased. After point t22', the increasing rate of a speed of the first motor 3 is continuously controlled in such a manner not to rotate the engine 2. Thereafter, when the input speed of the first clutch CL1 is synchronized with the output speed of the first clutch CL1 at point t25', engagement of the first clutch CL1 is started. Consequently, the engagement of the first clutch CL1 and the shifting operation to the EV-Lo mode are completed at point t26'.

Thus, as indicated in FIG. 20, a required time to shift the operating mode from the EV-Hi mode to the EV-Lo mode can be reduced by shifting the operating mode via the fixed mode. For this reason, when accelerating the hybrid vehicle 1 abruptly during propulsion in the EV Hi mode, a response delay in the acceleration can be reduced by thus shifting the operating mode to the EV-Lo mode via the fixed mode.

Although the above exemplary embodiments of the present disclosure have been described, it will be understood by those skilled in the art that the present disclosure should not be limited to the described exemplary embodiments, and various changes and modifications can be made within the scope of the present disclosure. For example, the control system may also be applied to a hybrid vehicle having at least two clutches, in which the operating mode is shifted by cranking the engine upon satisfaction of a predetermined condition during propulsion in the mode established by engaging any one of the clutches. In addition, after shifting from the dual-motor mode to the HV-mode, the determination of whether to shift the fixed mode may also be made on the basis of other factors. Further, in the routines shown in FIGS. 11 and 12, step S24 of the routines shown in FIGS. 15 and 16 may also be executed instead of step S4 and S8. Furthermore, in the routines shown in FIGS. 15 and 16, step S4 of the routine shown in FIG. 11 and step S8 of the routine shown in FIG. 12 may also be executed instead of step S24.

What is claimed is:

1. A control system for a hybrid vehicle comprising:
   a power split mechanism having a plurality of rotary elements including a first carrier connected to an engine, a first sun gear connected to a first motor, and a first ring gear connected to drive wheels, the power split mechanism including
      a first power split section having first carrier, the first sun gear, and a second ring gear; and
      a transmission having the first ring gear, a second sun gear connected to the second ring gear, and a second carrier;
   a second motor that is connected to the drive wheels to deliver a torque to the drive wheels;
   a first engagement device that selectively connects the first carrier and the second carrier and
   a second engagement device that selectively connects two of the first ring gear, the second sun gear, and the second carrier, of the transmission,
   wherein an operating mode of the hybrid vehicle is selected at least from a first operating mode in which the first engagement device is engaged and the second engagement device is disengaged, and a second operating mode in which the first engagement device is disengaged and the second engagement device is engaged,
   the control system further comprising:
   a controller that controls the operating mode,
   wherein the controller is configured to
   determine a satisfaction of at least any one of predetermined conditions including a first predetermined condition wherein a required amount of a total torque of a prime mover, including the engine and the second motor, applied to the drive wheels is greater than a predetermined torque, a second predetermined condition wherein a change in a speed of an output shaft changed by a torque delivered from the drive wheels is greater than a predetermined value, and that a third predetermined condition wherein a required period of time to complete a shifting operation between the first operating mode and the second operating mode is less than a predetermined period, when propelling the hybrid vehicle in any one of the first operating mode and the second operating mode while stopping the engine, and
   raise a rotational speed of the engine by the first motor while maintaining an engagement of the engaged one of the first engagement device and the second engagement device upon satisfaction of the at least any one of the predetermined conditions.

2. The control system for the hybrid vehicle as claimed in claim 1,
   wherein the at least any one of predetermined conditions which is satisfied includes the first predetermined condition, and
   the predetermined torque is set to a maximum total torque possible to be generated in a condition where the hybrid vehicle is propelled in said one of the operating modes while the engine is stopped, and an output torque of the second motor is restricted.

3. The control system for the hybrid vehicle as claimed in claim 2, wherein the output torque of the second motor is restricted when the output torque of the second motor reaches an upper limit value set based on a temperature of an electric storage device and a state of charge level of the electric storage device.

4. The control system for the hybrid vehicle as claimed in claim 1, further comprising:
   a one-way clutch that restricts a rotation of the first carrier in a predetermined direction, and that allows the first carrier to rotate in an opposite direction,
   wherein said one of the operating modes includes an electric vehicle mode in which the hybrid vehicle is propelled by generating a torque by the first motor in a direction to engage the one-way clutch and maintain the engagement of the one-way clutch.

5. The control system for the hybrid vehicle as claimed in claim 4,
wherein the at least any one of predetermined conditions which is satisfied includes the second predetermined condition, and
the predetermined value is set to a value smaller than a maximum allowable torque of the one-way clutch.

6. The control system for the hybrid vehicle as claimed in claim 5,
wherein the output shaft is connected to the drive wheels, and
the controller is further configured to determine the fact that the change in the speed of the output shaft is greater than the predetermined value when the change in the speed of the output shaft changed by the torque delivered from the drive wheels to the output shaft due to a road condition is greater than the predetermined value.

7. The control system for the hybrid vehicle as claimed in claim 4,
wherein the at least any one of predetermined conditions which is satisfied includes the third predetermined condition, and
the controller is further configured to determine whether the required period of time is less than the predetermined period when a required driving force is greater than a predetermined force, and a change amount or change rate of the required driving force is greater than a predetermined value.

8. The control system for the hybrid vehicle as claimed in claim 1, wherein the controller is further configured to
determine a demand to shift the operating mode from a hybrid mode in which the engine is started by the first motor to a fixed mode to be established by engaging both of the first engagement device, and the second engagement device, and
shift the operating mode to the fixed mode by engaging the engagement device disengaged in the current operating mode when it is required to shift the operating mode to the fixed mode.

9. The control system for the hybrid vehicle as claimed in claim 8, wherein the controller is further configured to determine a demand to shift the operating mode from said one of the operating modes to the fixed mode, if a rotational speed of at least any one of the engine, the rotary elements, and the first motor is higher than an allowable speed when rotating the first carrier by delivering a torque from the first motor to the first carrier while maintaining said one of the operating modes.

10. The control system for the hybrid vehicle as claimed in claim 8, wherein the controller is further configured to determine a demand to shift the operating mode from said one of the operating modes to the fixed mode, if the total torque is smaller than a required torque to be applied to the drive wheels during propulsion while maintaining said one of the operating modes.

11. The control system for the hybrid vehicle as claimed in claim 8, wherein the controller is further configured to
determine a demand to shift the operating mode from the fixed mode to the other operating mode, and
establish the other operating mode by maintaining engagement of one of the engagement devices engaged to establish the other operating mode while disengaging the other engagement device, when it is required to shift the operating mode to the other operating mode.

* * * * *